(12) United States Patent
Uchimura et al.

(10) Patent No.: US 10,965,926 B2
(45) Date of Patent: Mar. 30, 2021

(54) REPRODUCING APPARATUS, REPRODUCING METHOD, INFORMATION PROCESSING APPARATUS, INFORMATION PROCESSING METHOD, PROGRAM, AND RECORDING MEDIUM

(71) Applicant: SONY CORPORATION, Tokyo (JP)

(72) Inventors: Kouichi Uchimura, Kanagawa (JP); Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 240 days.

(21) Appl. No.: 15/500,952

(22) PCT Filed: Aug. 28, 2015

(86) PCT No.: PCT/JP2015/074344
§ 371 (c)(1),
(2) Date: Feb. 1, 2017

(87) PCT Pub. No.: WO2016/039172
PCT Pub. Date: Mar. 17, 2016

(65) Prior Publication Data
US 2017/0223329 A1    Aug. 3, 2017

(30) Foreign Application Priority Data

Sep. 12, 2014    (JP) ................ 2014-185967

(51) Int. Cl.
*H04N 9/79* (2006.01)
*H04N 5/91* (2006.01)
(Continued)

(52) U.S. Cl.
CPC ........... *H04N 9/7925* (2013.01); *G11B 20/10* (2013.01); *G11B 20/10527* (2013.01);
(Continued)

(58) Field of Classification Search
None
See application file for complete search history.

(56) References Cited

U.S. PATENT DOCUMENTS

| 2011/0035255 A1* | 2/2011 | Dasher | G06Q 30/02 705/14.72 |
| 2011/0150421 A1* | 6/2011 | Sasaki | G11B 27/3027 386/241 |

(Continued)

FOREIGN PATENT DOCUMENTS

| EP | 3193333 A1 | 7/2017 |
| EP | 3193334 A1 | 7/2017 |

(Continued)

OTHER PUBLICATIONS

Apr. 11, 2018, European search report issued for related EP Application No. 15840251.1.

(Continued)

*Primary Examiner* — Heather R Jones
(74) *Attorney, Agent, or Firm* — Paratus Law Group, PLLC

(57) ABSTRACT

The present technology relates to a reproducing apparatus for enabling an appropriate video depending on a viewing environment to be reproduced, a reproducing method, an information processing apparatus, an information processing method, a program, and a recording medium. The reproducing apparatus according to the present technology analyzes reproduction management information describing therein type information on a form of providing a HDR video which is compatible with a SDR video with a standard luminance range and whose luminance range is wider than the standard luminance range or a form of providing the SDR video compatible with the HDR video. Further, the reproducing apparatus acquires and reproduces encoding data of the HDR video or encoding data of the SDR video (Continued)

provided in a form indicated by the type information. The present technology is applicable to Blu-ray Disc players.

11 Claims, 34 Drawing Sheets

(51) Int. Cl.
*G11B 20/10* (2006.01)
*H04N 5/85* (2006.01)
*H04N 5/76* (2006.01)
*G11B 27/32* (2006.01)
*H04N 5/775* (2006.01)

(52) U.S. Cl.
CPC .............. *G11B 27/329* (2013.01); *H04N 5/76* (2013.01); *H04N 5/775* (2013.01); *H04N 5/85* (2013.01); *H04N 5/91* (2013.01); *G11B 2020/10537* (2013.01)

(56) References Cited

U.S. PATENT DOCUMENTS

| 2013/0188928 A1* | 7/2013 | Ogawa | H04N 9/8211 |
| | | | 386/248 |
| 2017/0105042 A1* | 4/2017 | Toma | H04N 5/765 |

FOREIGN PATENT DOCUMENTS

| JP | 2009-058692 | 3/2009 |
| JP | 2009-089209 | 4/2009 |
| WO | WO2010/038365 A1 | 4/2010 |
| WO | WO2012/147350 A1 | 11/2012 |
| WO | WO2013/046096 A1 | 4/2013 |
| WO | WO 2015/198553 A1 | 12/2015 |
| WO | WO 2016/039024 A1 | 3/2016 |

OTHER PUBLICATIONS

Oct. 18, 2018, Japanese Office Action issued for related JP application No. 2016-547365.

* cited by examiner

FIG. 2

| | |
|---|---|
| HDR-COMPATIBLE PLAYER | Mandatory HDR |
| | Mandatory/Option A HDR |
| | Mandatory/Option B HDR |
| | Mandatory/Option A/Option B HDR |
| HDR-COMPATIBLE DISPLAY | Mandatory HDR |
| | Mandatory/Option A HDR |
| | Mandatory/Option B HDR |
| | Mandatory/Option A/Option B HDR |
| HDR DISC | Mandatory HDR |
| | Mandatory/Option A HDR |
| | Mandatory/Option B HDR |
| | Mandatory/Option A/Option B HDR |

FIG. 3

| BD Player REPRODUCTION Capability | Contents in BD | Display DISPLAY Capability | REPRODUCTION/ DISPLAY | COMMENTS |
|---|---|---|---|---|
| HDR player (Mandatory only) | Mandatory HDR | Mandatory HDR only | Mandatory HDR | |
| | | Mandatory/Option A HDR | Mandatory HDR | |
| | | Mandatory/Option B HDR | Mandatory HDR | |
| | Mandatory/ Option A HDR | Mandatory HDR only | Mandatory HDR | Player IS NOT FOR Option A AND Mandatory HDR IS REPRODUCED IRRESPECTIVE OF Display |
| | | Mandatory/Option A HDR | Mandatory HDR | AS ABOVE |
| | | Mandatory/Option B HDR | Mandatory HDR | AS ABOVE |
| | Mandatory/ Option B HDR | Mandatory HDR only | Mandatory HDR | Player IS NOT FOR Option B AND Mandatory HDR IS REPRODUCED UNCONDITIONALLY |
| | | Mandatory/Option A HDR | Mandatory HDR | AS ABOVE |
| | | Mandatory/Option B HDR | Mandatory HDR | AS ABOVE |

FIG. 4

| BD Player REPRODUCTION Capability | Contents in BD | Display DISPLAY Capability | REPRODUCTION/ DISPLAY | COMMENTS |
|---|---|---|---|---|
| HDR player (Mandatory/ Option A) | Mandatory HDR | Mandatory HDR only | Mandatory HDR | |
| | | Mandatory/Option A HDR | Mandatory HDR | |
| | | Mandatory/Option B HDR | Mandatory HDR | |
| | Mandatory/ Option A HDR | Mandatory HDR only | Mandatory HDR | Display IS NOT FOR Option A HDR AND Mandatory HDR IS REPRODUCED |
| | | Mandatory/Option A HDR | Mandatory/ Option A HDR | VIDEO TO BE REPRODUCED CAN BE DETERMINED BY Player SETTING |
| | | Mandatory/Option B HDR | Mandatory HDR | Display IS NOT FOR Option A HDR AND Mandatory HDR IS REPRODUCED |
| | Mandatory/ Option B HDR | Mandatory HDR only | Mandatory HDR | Player IS NOT FOR Option B AND Mandatory HDR IS REPRODUCED IRRESPECTIVE OF Display |
| | | Mandatory/Option A HDR | Mandatory HDR | AS ABOVE |
| | | Mandatory/Option B HDR | Mandatory HDR | AS ABOVE |

FIG. 5

| BD Player REPRODUCTION Capability | Contents in BD | Display DISPLAY Capability | REPRODUCTION/DISPLAY | COMMENTS |
|---|---|---|---|---|
| HDR player (Mandatory/Option B) | Mandatory HDR | Mandatory HDR only | Mandatory HDR | |
| | | Mandatory/Option A HDR | Mandatory HDR | |
| | | Mandatory/Option B HDR | Mandatory HDR | |
| | Mandatory/Option A HDR | Mandatory HDR only | Mandatory HDR | Player IS NOT FOR Option A AND Mandatory HDR IS REPRODUCED IRRESPECTIVE OF Display |
| | | Mandatory/Option A HDR | Mandatory HDR | AS ABOVE |
| | | Mandatory/Option B HDR | Mandatory HDR | AS ABOVE |
| | Mandatory/Option B HDR | Mandatory HDR only | Mandatory HDR | Display IS NOT FOR Option B HDR AND Mandatory HDR IS REPRODUCED |
| | | Mandatory/Option A HDR | Mandatory HDR | Display IS NOT FOR Option B HDR AND Mandatory HDR is REPRODUCED |
| | | Mandatory/Option B HDR | Mandatory/Option B HDR | VIDEO TO BE REPRODUCED CAN BE DETERMINED BY Player SETTING, FOR EXAMPLE |

FIG. 6

| BD Player REPRODUCTION Capability | Contents in BD | Display DISPLAY Capability | REPRODUCTION/DISPLAY |
|---|---|---|---|
| HDR player (Mandatory/ Option A/Option B) | Mandatory HDR | Mandatory HDR only | Mandatory HDR |
| | | Mandatory/Option A HDR | Mandatory HDR |
| | | Mandatory/Option B HDR | Mandatory HDR |
| | | Mandatory/Option A/Option B HDR | Mandatory HDR |
| | Mandatory/Option A HDR | Mandatory HDR only | Mandatory HDR |
| | | Mandatory/Option A HDR | Mandatory/Option A HDR |
| | | Mandatory/Option B HDR | Mandatory HDR |
| | | Mandatory/Option A/Option B HDR | Mandatory/Option A HDR |
| | Mandatory/Option B HDR | Mandatory HDR only | Mandatory HDR |
| | | Mandatory/Option A HDR | Mandatory HDR |
| | | Mandatory/Option B HDR | Mandatory/Option B HDR |
| | | Mandatory/Option A/Option B HDR | Mandatory/Option B HDR |
| | Mandatory/ Option A/Option B HDR | Mandatory HDR only | Mandatory HDR |
| | | Mandatory/Option A HDR | Mandatory/Option A HDR |
| | | Mandatory/Option B HDR | Mandatory/Option B HDR |
| | | Mandatory/Option A/Option B HDR | Mandatory/Option A/ Option B HDR |

FIG. 13

| Syntax | No. of bits | Mnemonic |
|---|---|---|
| xxxxx.mpls { | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++) { | | |
|         padding_word | 16 | bslbf |
|     } | | |
|     PlayList() | | |
|     for(i=0; i<N2; i++) { | | |
|         padding_word | 16 | bslbf |
|     } | | |
|     PlayListMark() | | |
|     for(i=0; i<N3; i++) { | | |
|         padding_word | 16 | bslbf |
|     } | | |
|     ExtensionData() | | |
|     for(i=0; i<N4; i++) { | | |
|         padding_word | 16 | bslbf |
|     } | | |
| } | | |

FIG. 14

| Syntax | No. of bits | Mnemonic |
|---|---|---|
| AppInfoPlayList() { | | |
|   length | 32 | uimsbf |
|   reserved_for_future_use | 8 | bslbf |
|   PlayList_playback_type | 8 | bslbf |
|   if(PlayList_playback_type==2||PlayList_playback_type==3{ | | |
|     playback_count | 16 | uimsbf |
|   }else{ | | |
|     reserved_for_futute_use | 16 | bslbf |
|   } | | |
|   UO_mask_table() | | |
|   PlayList_random_access_flag | 1 | bslbf |
|   audio_mix_app_flag | 1 | bslbf |
|   lossless_may_bypass_mixer_flag | 1 | bslbf |
|   MVC_Base_view_R_flag | 1 | bslbf |
|   HDR_flag | 1 | bslbf |
|   option_A_HDR_flag | 1 | bslbf |
|   option_B_HDR_flag | 1 | bslbf |
|   HDR_compatible_type | 2 | bslbf |
|   reserved_for_future_use | 7 | bslbf |
| } | | |

FIG. 15

| | VALUE: MEANING |
|---|---|
| HDR_flag | 0b: NOT INCLUDING Mandatory HDR<br>1b: INCLUDING Mandatory HDR |
| option_A_HDR_flag | 0b: NOT INCLUDING Option A HDR<br>1b: INCLUDING Option A HDR |
| option_B_HDR_flag | 0b: NOT INCLUDING Option B HDR<br>1b: INCLUDING Option B HDR |
| HDR_compatible_type | 00b: NO MEANS FOR HDR/SDR COMPATIBILITY<br>01b: HDR/SDR-COMPATIBLE STREAM IS INCLUDED IN Clip INDICATED BY PlayList<br>10b: HDR/SDR-COMPATIBLE STREAM IS PREPARED IN Clip INDICATED BY ANOTHER PlayList<br>11b: HDR/SDR-COMPATIBLE STREAM IS PREPARED IN ANOTHER disc |

REPRODUCING APPARATUS, REPRODUCING METHOD, INFORMATION PROCESSING APPARATUS, INFORMATION PROCESSING METHOD, PROGRAM, AND RECORDING MEDIUM

CROSS REFERENCE TO PRIOR APPLICATION

This application is a National Stage Patent Application of PCT International Patent Application No. PCT/JP2015/074344 (filed on Aug. 28, 2015) under 35 U.S.C. § 371, which claims priority to Japanese Patent Application No. 2014-185967 (filed on Sep. 12, 2014), which are all hereby incorporated by reference in their entirety.

TECHNICAL FIELD

The present technology relates to a reproducing apparatus, a reproducing method, an information processing apparatus, an information processing method, a program and a recording medium, and particularly to a reproducing apparatus for enabling an appropriate video depending on a viewing environment to be reproduced, a reproducing method, an information processing apparatus, an information processing method, a program, and a recording medium.

BACKGROUND ART

There is a medium for recording contents such as movies such as Blu-ray (registered trademark) disc (which will be denoted as BD below as needed). Conventionally, a video to be recorded in a BD is authored by compressing a dynamic range of a master video assuming that it is viewed on a display with a standard luminance (maximum luminance of 100 nit (=100 cd/m$^2$)).

The master video is shot with a high-quality camera, and has a dynamic range of not less than a dynamic range displayable on the display with a standard luminance. The dynamic range of the master video is naturally lost when compressed.

With the progress of the display technique such as organic electroluminescence (EL) display or liquid crystal display (LCD), displays above average in brightness such as maximum luminance of 500 nit or 1000 nit are commercially available, and contents are requested to make use of the capability of such a display.

Therefore, there has been considered, in recent years, a standard for enabling a high dynamic range (HDR) video as video with an extended dynamic range to be recorded in Blu-ray Disc Association (BDA) as Blu-ray disc standard setting association.

CITATION LIST

Patent Document

Patent Document 1: Japanese Patent Application Laid-open No. 2009-58692
Patent Document 2: Japanese Patent Application Laid-Open No. 2009-89209

SUMMARY OF THE INVENTION

Problems to be Solved by the Invention

Many displays not for displaying a HDR video are present, and thus a BD player needs to reproduce an appropriate video depending on a viewing environment. Even if data of a HDR video is output, when a display does not have the capability to display the same, the video with author-intended color and brightness cannot be displayed.

The present technology has been made in terms of such a situation, and is directed to enabling an appropriate video depending on a viewing environment to be reproduced.

Solutions to Problems

A reproducing apparatus according to one aspect of the present technology includes: a control unit for analyzing reproduction management information describing therein type information on a form of providing a HDR video which is compatible with a SDR video with a standard luminance range and whose luminance range is wider than the standard luminance range, or a form of providing the SDR video compatible with the HDR video; an acquisition unit for acquiring encoding data of the HDR video or encoding data of the SDR video provided in a form indicated by the type information; and a reproducing unit for reproducing the acquired encoding data of the HDR video or the encoding data of the SDR video.

According to one aspect of the present technology, reproduction management information describing therein type information on a form of providing a HDR video which is compatible with a SDR video with a standard luminance range and whose luminance range is wider than the standard luminance range, or a form of providing the SDR video compatible with the HDR video is analyzed, encoding data of the HDR video or encoding data of the SDR video provided in a form indicated by the type information is acquired, and the acquired encoding data of the HDR video or the encoding data of the SDR video is reproduced.

Effects of the Invention

According to the present technology, it is possible to reproduce an appropriate video depending on a viewing environment.

Additionally, the effects described herein are not necessarily limited, and any effect described in the present disclosure may be obtained.

BRIEF DESCRIPTION OF DRAWINGS

FIG. 2 is a diagram illustrating the kinds of players, displays, and BDs.

FIG. 3 is a diagram illustrating the kinds of HDR videos reproduced by a Mandatory HDR-compatible player and displayed on displays.

FIG. 4 is a diagram illustrating the kinds of HDR videos reproduced by a Mandatory/Option A HDR-compatible player and displayed on displays.

FIG. 5 is a diagram illustrating the kinds of HDR videos reproduced by a Mandatory/Option B HDR-compatible player and displayed on displays.

FIG. 6 is a diagram illustrating the kinds of HDR videos reproduced by a Mandatory/Option A/Option B HDR-compatible player and displayed on displays.

FIG. 13 is a diagram illustrating a syntax of PlayList.

FIG. 14 is a diagram illustrating an exemplary syntax of AppInfoPlayList( ) of FIG. 13.

FIG. 15 is a diagram illustrating the meanings of values of respective items of information.

MODE FOR CARRYING OUT THE INVENTION

A mode for carrying out the present technology will be described below. The description will be made in the following order.

1. Recording/reproducing system
2. BD format
3. Configurations of apparatuses
4. Operations of apparatuses
5. Variants <<1. Recording/Reproducing System>>

Figure 1:
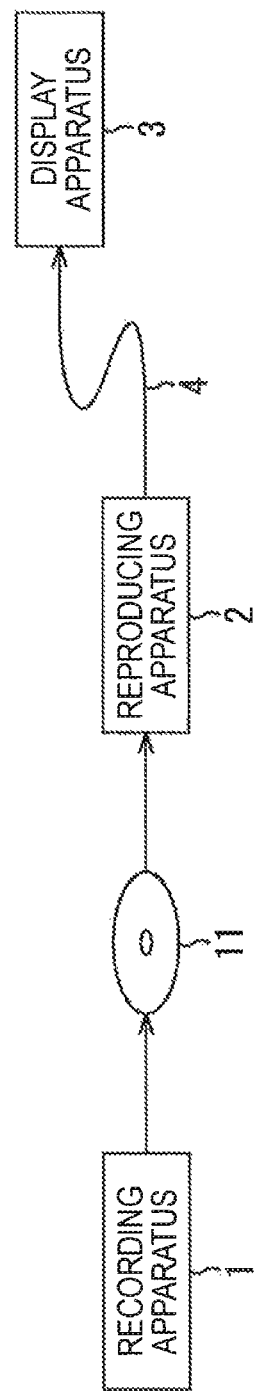
FIG. 1 is a diagram illustrating an exemplary configuration of a recording/reproducing system according to one exemplary embodiment of the present technology.

FIG. 1 is a diagram illustrating an exemplary configuration of a recording/reproducing system according to one exemplary embodiment of the present technology.

The recording/reproducing system of FIG. 1 is configured of a recording apparatus 1, a reproducing apparatus 2, and a display apparatus 3. The reproducing apparatus 2 is connected to the display apparatus 3 via a cable 4 with a predetermined standard such as high definition multimedia interface (HDMI) (registered trademark) standard. The reproducing apparatus 2 may be connected to the display apparatus 3 via wireless communication.

The recording apparatus 1 records contents in a disc 11, and the reproducing apparatus 2 reproduces the contents recorded in the disc 11. The contents are provided from the recording apparatus 1 to the reproducing apparatus 2 by use of the disc 11. The disc 11 is an optical disc recording contents therein in a Blu-ray (registered trademark) disc read-only (BD-ROM) format, for example.

Contents may be recorded in the disc 11 in other BD format such as BD-R or BD-RE. Further, contents may be provided from the recording apparatus 1 to the reproducing apparatus 2 by use of a removable medium other than optical disc, such as memory card mounting a flash memory thereon.

When the disc 11 is a BD-ROM disc, the recording apparatus 1 is used by an author of the contents. The description will be made herein assuming that a disc in which contents are recorded by the recording apparatus 1 is provided to the reproducing apparatus 2, but actually a disc replicated on the basis of a master disc in which contents are recorded by the recording apparatus 1 is provided to the reproducing apparatus 2.

The recording apparatus 1 generates contents including a standard dynamic range (SDR) video as video with a dynamic range (luminance range) displayable on a display with a standard luminance. A maximum luminance of the display with a standard luminance is 100 cd/m$^2$ (=100 nit), for example. Further, the recording apparatus 1 generates contents including a high dynamic range (HDR) video with a wider dynamic range than the SDR video as needed.

For example, a SDR video is generated by compressing a dynamic range of a master video. A HDR video is generated to have a wider dynamic range than the SDR video by adjusting the dynamic range of the master video. A maximum luminance of the HDR video is higher than a standard luminance of 1000 nit, for example.

In a BD format to which the present technology is applied, one Mandatory HDR technique and a plurality of Option HDR techniques are employed for the HDR techniques for generating a HDR video.

The Mandatory HDR technique is essential when a HDR technique is employed in the BD format. On the other hand, the Option HDR techniques are not essential but selectively-employable HDR techniques. The respective HDR techniques are different in signal processing for generating a HDR video.

The cases using the Mandatory HDR technique and two Option HDR techniques of Option A HDR technique and Option B HDR technique will be described below. A HDR video generated by use of the Mandatory HDR technique is assumed as Mandatory HDR video.

Further, a HDR video generated by use of the Option A HDR technique is assumed as Option A HDR video, and a HDR video generated by use of the Option B HDR technique is assumed as Option B HDR video. The Option A HDR video and the Option B HDR video will be collectively denoted as Option HDR video as needed when they do not need to be discriminated from each other.

The Mandatory HDR video can be reproduced only by a player having a Mandatory HDR video reproduction function, and can be displayed only on a display having a Mandatory HDR video display function.

Similarly, the Option A HDR video can be reproduced only by a player having an Option A HDR video reproduction function, and can be displayed only on a display having an Option A HDR video display function. The Option B HDR video can be reproduced only by a player having an Option B HDR video reproduction function, and can be displayed only on a display having an Option B HDR video display function.

While the disc 11 recording the HDR videos therein is being reproduced, the reproducing apparatus 2 recognizes the kinds of the recorded HDR videos, the kinds of its reproducible HDR videos, the kinds of HDR videos displayable on a display of the display apparatus 3, and the like, and performs an appropriate processing.

FIG. 2 is a diagram illustrating the kinds of players, displays, and BDs.

The HDR-compatible players are players mounting a HDR video reproduction function thereon. The HDR-compatible players are a Mandatory HDR-compatible player, a Mandatory/Option A HDR-compatible player, a Mandatory/Option B HDR-compatible player, and a Mandatory/Option A/Option B HDR-compatible player.

The Mandatory HDR-compatible player is a player only for reproducing the Mandatory HDR video among the HDR videos. The Mandatory/Option A HDR-compatible player is a player for reproducing the Mandatory HDR video and reproducing the Option A HDR video. The Mandatory/Option B HDR-compatible player is a player for reproducing the Mandatory HDR video and reproducing the Option B HDR video. The Mandatory/Option A/Option B HDR-compatible player is a player for reproducing all the kinds of HDR videos.

Additionally, even a player not for HDR, which does not mount a HDR video reproduction function thereon, has a SDR video reproduction function.

The HDR-compatible displays are displays mounting a HDR video display function thereon. The HDR-compatible displays are a Mandatory HDR-compatible display, a Mandatory/Option A HDR-compatible display, a Mandatory/Option B HDR-compatible display, and a Mandatory/Option A/Option B HDR-compatible display.

The Mandatory HDR-compatible display is a display only for displaying the Mandatory HDR video among the HDR videos. The Mandatory/Option A HDR-compatible display is a display for displaying the Mandatory HDR video and displaying the Option A HDR video. The Mandatory/Option B HDR-compatible display is a display for displaying the Mandatory HDR video and displaying the Option B HDR video. The Mandatory/Option A/Option B HDR-compatible display is a display for displaying all the kinds of HDR videos.

Additionally, the display capabilities of the displays are not defined in the BD format. There can be assumed a display not for displaying the Mandatory HDR video but for displaying only the Option HDR videos.

The HDR discs are BDs recording a HDR video therein. The HDR discs are a Mandatory HDR disc, a Mandatory/Option A HDR disc, a Mandatory/Option B HDR disc, and a Mandatory/Option A/Option B HDR disc.

The Mandatory HDR disc is a disc recording only the Mandatory HDR video among the HDR videos therein. The Mandatory/Option A HDR disc is a disc recording the Mandatory HDR video and the Option A HDR video therein. The Mandatory/Option B HDR disc is a disc recording the Mandatory HDR video and the Option B HDR video therein. The Mandatory/Option A/Option B HDR disc is a disc recording all the kinds of HDR videos therein.

The HDR discs may record a SDR video together with a HDR video.

FIG. 3 is a diagram illustrating the kinds of HDR videos reproduced by the Mandatory HDR-compatible player and displayed on the displays.

A case for the Mandatory/Option A/Option B HDR disc and a case for the Mandatory/Option A/Option B HDR-compatible display are omitted in FIG. 3. This is similarly applicable to FIG. 4 and FIG. 5.

When an inserted BD is the Mandatory HDR disc, whichever display a display as output destination of the HDR video is, the Mandatory HDR-compatible player reproduces the Mandatory HDR video. The Mandatory HDR video is displayed on the displays on the basis of the data output from the Mandatory HDR-compatible player.

When an inserted BD is the Mandatory/Option A HDR disc, whichever display a display as output destination of the HDR video is, the Mandatory HDR-compatible player reproduces the Mandatory HDR video. This is because the player is not for reproducing the Option A HDR video recorded in the BD. The Mandatory HDR video is displayed on the displays on the basis of the data output from the Mandatory HDR-compatible player.

When an inserted BD is the Mandatory/Option B HDR disc, whichever display a display as output destination of the HDR video is, the Mandatory HDR-compatible player reproduces the Mandatory HDR video. This is because the player is not for reproducing the Option B HDR video recorded in the BD. The Mandatory HDR video is displayed on the displays on the basis of the data output from the Mandatory HDR-compatible player.

FIG. 4 is a diagram illustrating the kinds of HDR videos reproduced by the Mandatory/Option A HDR-compatible player and displayed on the displays.

When an inserted BD is the Mandatory HDR disc, whichever display a display as output destination of the HDR video is, the Mandatory/Option A HDR-compatible player reproduces the Mandatory HDR video. The Mandatory HDR video is displayed on the displays on the basis of the data output from the Mandatory/Option A HDR-compatible player.

When an inserted BD is the Mandatory/Option A HDR disc and a display as output destination of the HDR video is the Mandatory HDR-compatible display or the Mandatory/Option B HDR-compatible display, the Mandatory/Option A HDR-compatible player reproduces the Mandatory HDR video. This is because the displays are not for displaying the Option A HDR video recorded in the BD. The Mandatory HDR video is displayed on the displays on the basis of the data output from the Mandatory/Option A HDR-compatible player.

On the other hand, when an inserted BD is the Mandatory/Option A HDR disc and a display as output destination of the HDR video is the Mandatory/Option A HDR-compatible display, the Mandatory/Option A HDR-compatible player reproduces either the Mandatory HDR video or the Option A HDR video. A HDR video to be reproduced is determined depending on the setting of the Mandatory/Option A HDR-compatible player, or the like. The Mandatory HDR video or the Option A HDR video is displayed on the display on the basis of the data output from the Mandatory/Option A HDR-compatible player.

When an inserted BD is the Mandatory/Option B HDR disc, whichever display a display as output destination of the HDR video is the Mandatory/Option A HDR-compatible player reproduces the Mandatory HDR video. This is because the player is not for reproducing the Option B HDR video recorded in the BD. The Mandatory HDR video is displayed on the displays on the basis of the data output from the Mandatory/Option A HDR-compatible player.

FIG. 5 is a diagram illustrating the kinds of HDR videos reproduced by the Mandatory/Option B HDR-compatible player and displayed on the displays.

When an inserted BD is the Mandatory HDR disc, whichever display a display as output destination of the HDR video is, the Mandatory/Option B HDR-compatible player reproduces the Mandatory HDR video. The Mandatory HDR video is displayed on the displays on the basis of the data output from the Mandatory/Option B HDR-compatible player.

When an inserted BD is the Mandatory/Option A HDR disc, whichever display a display as output destination of the HDR video is, the Mandatory/Option B HDR-compatible player reproduces the Mandatory HDR video. This is because the player is not for reproducing the Option A HDR video recorded in the BD. The Mandatory HDR video is displayed on the displays on the basis of the data output from the Mandatory/Option B HDR-compatible player.

When an inserted BD is the Mandatory/Option B HDR disc and a display as output destination of the HDR video is the Mandatory HDR-compatible display or the Mandatory/Option A HDR-compatible display, the Mandatory/Option B HDR-compatible player reproduces the Mandatory HDR video. This is because the displays are not for displaying the Option B HDR video recorded in the BD. The Mandatory HDR video is displayed on the displays on the basis of the data output from the Mandatory/Option B HDR-compatible player.

On the other hand, when an inserted BD is the Mandatory/Option B HDR disc and a display as output destination of the HDR video is the Mandatory/Option B HDR-compatible display, the Mandatory/Option B HDR-compatible player reproduces either the Mandatory HDR video or the Option B HDR video. A HDR video to be reproduced is determined depending on the setting of the Mandatory/Option B HDR-compatible player, or the like. The Mandatory HDR video or the Option B HDR video is displayed on the display on the basis of the data output from the Mandatory/Option B HDR-compatible player.

FIG. 6 is a diagram illustrating the kinds of HDR videos reproduced by the Mandatory/Option A/Option B HDR-compatible player and displayed on the displays.

When an inserted BD is the Mandatory HDR disc, whichever display a display as output destination of the HDR video is, the Mandatory/Option A/Option B HDR-compatible player reproduces the Mandatory HDR video. The Mandatory HDR video is displayed on the displays on the basis of the data output from the Mandatory/Option A/Option B HDR-compatible player.

When an inserted BD is the Mandatory/Option A HDR disc and a display as output destination of the HDR video is the Mandatory HDR-compatible display or the Mandatory/Option B HDR-compatible display, the Mandatory/Option A/Option B HDR-compatible player reproduces the Mandatory HDR video. This is because the displays are not for displaying the Option A HDR video recorded in the BD. The Mandatory HDR video is displayed on the displays on the basis of the data output from the Mandatory/Option A/Option B HDR-compatible player.

On the other hand, when an inserted BD is the Mandatory/Option A HDR disc and a display as output destination of the HDR video is the Mandatory/Option A HDR-compatible display or the Mandatory/Option A/Option B HDR-compatible display, the Mandatory/Option A/Option B HDR-compatible player reproduces either the Mandatory HDR video or the Option A HDR video. A HDR video to be reproduced is determined depending on the setting of the Mandatory/Option A/Option B HDR-compatible player, or the like. The Mandatory HDR video or the Option A HDR video is displayed on the displays on the basis or the data output from the Mandatory/Option A/Option B HDR-compatible player.

When an inserted BD is the Mandatory/Option B HDR disc and a display as output destination or the HDR video is the Mandatory HDR-compatible display or the Mandatory/Option A HDR-compatible display, the Mandatory/Option A/Option B HDR-compatible player reproduces the Mandatory HDR video. This is because the displays are not for displaying the Option B HDR video recorded in the BD. The Mandatory HDR video is displayed on the displays on the basis of the data output from the Mandatory/Option A/Option B HDR-compatible player.

On the other hand, when an inserted BD is the Mandatory/Option B HDR disc and a display as output destination of the HDR video is the Mandatory/Option B HDR-compatible display or the Mandatory/Option A/Option B HDR-compatible display, the Mandatory/Option A/Option B HDR-compatible player reproduces either the Mandatory HDR video or the Option B HDR video. A. HDR video to be reproduced is determined depending on the setting of the Mandatory/Option A/Option B HDR-compatible player, or the like. The Mandatory HDR video or the Option B HDR video is displayed on the displays on the basis of the data output from the Mandatory/Option A/Option B HDR-compatible player.

When an inserted BD is the Mandatory/Option A/Option B HDR disc and a display as output destination of the HDR video is the Mandatory HDR-compatible display, the Mandatory/Option A/Option B HDR-compatible player reproduces the Mandatory HDR video. The Mandatory HDR video is displayed on the display on the basis of the data output from the Mandatory/Option A/Option B HDR-compatible player.

On the other hand, when an inserted BD is the Mandatory/Option A/Option B HDR disc and a display as output destination of the HDR video is the Mandatory/Option A HDR-compatible display, the Mandatory/Option A/Option E HDR-compatible player reproduces the Mandatory HDR video or the Option A HDR video. A HDR video to be reproduced, is determined depending on the setting of the Mandatory/Option A/Option B HDR-compatible player, or the like. The Mandatory HDR video or the Option A HDR video is displayed on the display on the basis of the data output from the Mandatory/Option A/Option B HDR-compatible player.

When an inserted BD is the Mandatory/Option A/Option B HDR disc and a display as output destination of the HDR video is the Mandatory/Option B HDR-compatible display, the Mandatory/Option A/Option B HDR-compatible player reproduces the Mandatory HDR video or the Option B HDR video. A HDR video to be reproduced is determined depending on the setting of the Mandatory/Option A/Option B HDR-compatible player, or the like. The Mandatory HDR video or the Option B HDR video is displayed on the display on the basis of the data output from the Mandatory/Option A/Option B HDR-compatible player.

When an inserted BD is the Mandatory/Option A/Option B HDR disc and a display as output destination of the HDR video is the Mandatory/Option A/Option B HDR-compatible display, the Mandatory/Option A/Option B HDR-compatible player reproduces any kind of HDR video. A HDR video to be reproduced is determined depending on the setting of the Mandatory/Option A/Option B HDR-compatible player, or the like. The Mandatory HDR video, the Option B HDR video, or the Option B HDR video is displayed on the display on the basis of the data output from the Mandatory/Option A/Option B HDR-compatible player.

In this way, a kind of HDR video among the HDR videos recorded in the disc 11, which can be reproduced by the reproducing apparatus 2 and can be displayed on a display as output destination, is reproduced in the reproducing apparatus 2 as BD player. A HDR video to be reproduced is determined on the basis of the information recorded in the disc 11, or the like.

<Video Recording Forms>

As described above, when a display as output destination is not for displaying a HDR video, the HDR-compatible player cannot reproduce a HDR video. In this case, if a SDR video having the same contents to be used instead of the HDR video is prepared, the HDR-compatible player can reproduce the SDR video and display the SDR video on the display.

When providing a HDR video, the content provider needs to prepare and provide a SDR video having the same contents in order to ensure the compatibility therebetween.

Further, when a display as output destination is for displaying a HDR video, the HDR-compatible player can provide a better-quality video when reproducing the HDR video than when reproducing the SDR video.

When providing a SDR video, the content provider preferably prepares and provides a HDR video having the same contents.

The following three recording forms for compatible HDR video and SDR video are assumed for the BD, for example. A SDR video compatible with a HDR video means a SDR video reproducible instead of a HDR video. Further, a HDR video compatible with a SDR video means a HDR video reproducible instead of a SDR video.

Figure 7:
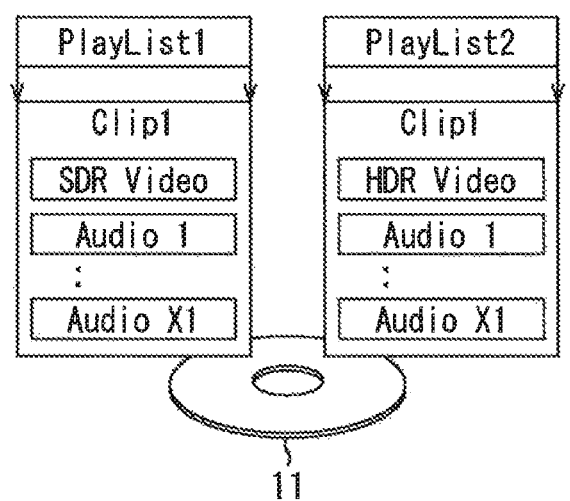
FIG. 7 is a diagram illustrating a first form of recording a HDR video and a SDR video.

FIG. 7 is a diagram illustrating a first form of recording a HDR video and a SDR video.

A SDR video and a HDR video are recorded in the disc 11 of FIG. 7. The SDR video and the HDR video recorded in the disc 11 are compatible videos having the same contents.

For example, when the HDR video is instructed to reproduce and a display as output destination is not for displaying the HDR video, the SDR video is reproduced instead of the HDR video. Further, when the SDR video is instructed to reproduce and a display as output destination is for displaying the HDR video, the HDR video is reproduced instead of the SDR video.

An encoding stream of the SDR video of FIG. 7 is included in an AV stream of Clip1 referred to by PlayList1 together with a plurality of audio streams. Further, an encoding stream of the HDR video is included in an AV stream of Clip1 referred to by PlayList2 together with the same audio streams. PlayList and Clip in the BD format will be described below.

In this way, a form of recording a HDR video and a SDR video is to include respective encoding streams in different AV streams to be recorded in one BD.

Figure 8:
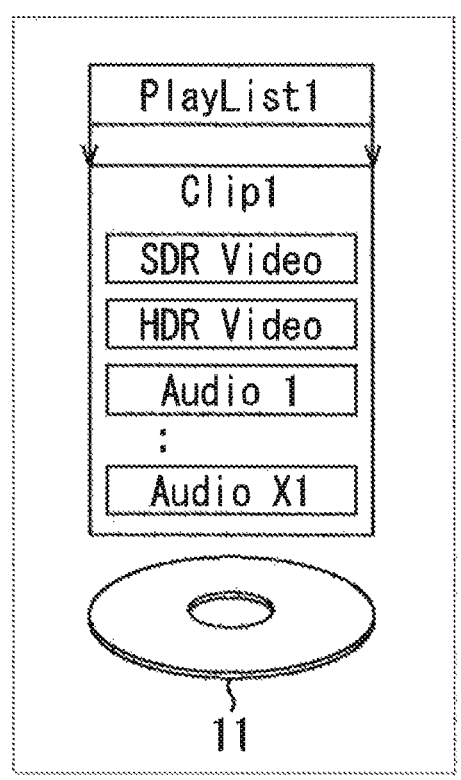
FIG. 8 is a diagram illustrating a second form of recording a HDR video and a SDR video.

FIG. 8 is a diagram illustrating a second form of recording a HDR video and a SDR video.

A SDR video and a HDR video which have the same contents and are compatible with each other are recorded in the disc 11 of FIG. 8. The encoding stream of the SDR video and the encoding stream of the HDR video are included in the AV stream of Clip1 referred to by PlayList1 together with a plurality of audio streams.

In this way, a form of recording a HDR video and a SDR video is to include respective encoding streams in the same AV stream to be recorded in one BD.

Figure 9:
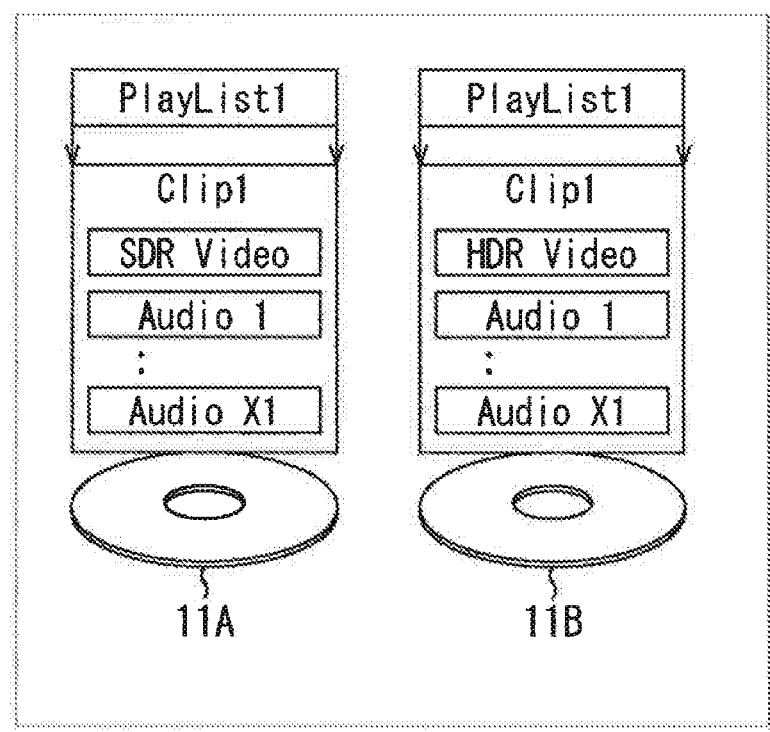
FIG. 9 is a diagram illustrating a third form of recording a HDR video and a SDR video.

FIG. 9 is a diagram illustrating a third form of recoding a HDR video and a SDR video.

FIG. 9 illustrates two BDs of a disc 11A and a disc 11B. The SDR video is recorded in the disc 11A. The encoding stream of the SDR video is included in the AV stream of Clip1 referred to by PlayList1 recorded in the disc 11A together with a plurality of audio streams.

On the other hand, the HDR video is recorded in the disc 11B. The SDR video recorded in the disc 11A and the HDR video recorded in the disc 11B are compatible videos having the same contents. The encoding stream of the HDR video is included in the AV stream of Clip1 referred to by PlayList1 recorded in the disc 11B together with the same audio streams.

When a display connected to the HDR-compatible player is not for displaying the HDR video, the user views the contents by use of the disc 11A. Further, when a display connected to the HDR-compatible player is for displaying the HDR video, the user views the contents by use of the disc 11B.

In this way, a form of recording a HDR video and a SDR video is to record respective encoding streams in different BDs. For example, a BD recording the encoding stream of the HDR video therein and a BD recording the encoding stream of the SDR video therein are sold in a pair.

A processing of switching a video to be reproduced depending on a viewing environment in the reproducing apparatus 2 will be described below.

<<2. BD Format>>

A BD-ROM format will be described herein.

<Data Management Structure>

Figure 10:
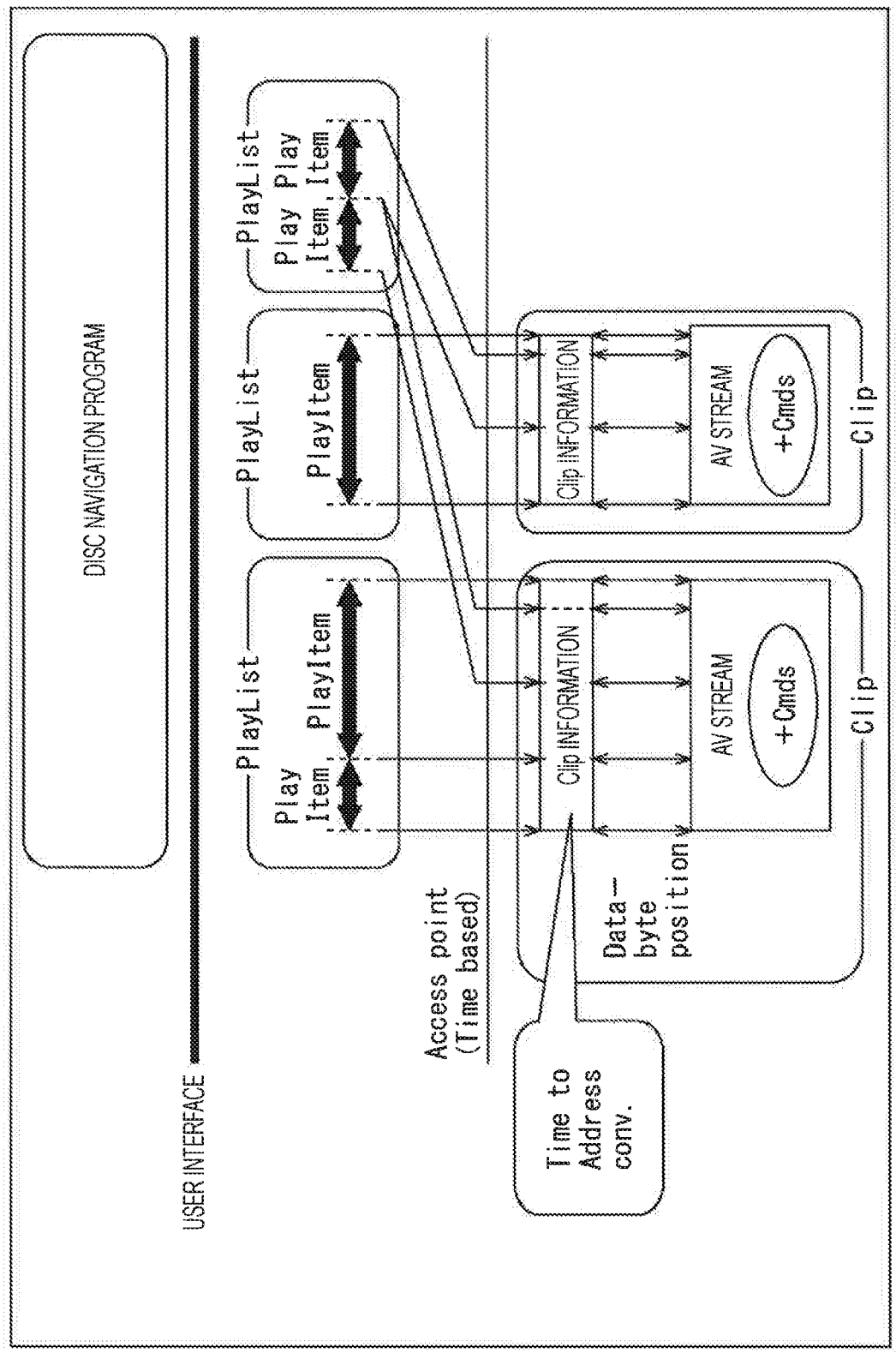
FIG. 10 is a diagram illustrating an exemplary management structure of AV streams in a BD-ROM format.

FIG. 10 is a diagram illustrating an exemplary management structure of AV streams in a BD-ROM format.

The AV streams are managed by use of two layers of PlayList and Clip. The AV streams may be recorded in a local storage of the reproducing apparatus 2 not only in the disc 11.

A pair of AV stream and Clip Information attached therewith is managed as one object. The pair of AV stream and Clip Information is denoted as Clip.

An AV stream is developed on a time axis, and the access points of each Clip are mainly designated at time stamps in PlayList. Clip Information is used for finding an address to start decoding in the AV stream.

PlayList is a set of AV stream reproduction periods. One reproduction period in an AV stream is denoted as PlayItem. PlayItem is indicated by a pair of IN point and OUT point in a reproduction period on the time axis. As illustrated in FIG. 10, PlayList is configured of one or more PlayItems.

The first PlayList from the left of FIG. 10 is configured of two PlayItems, and the first half and the second half of the AV stream included in the left Clip are referred to by the two PlayItems, respectively.

The second PlayList from the left is configured of one PlayItem, and the entire AV stream included in the right Clip is referred to by it.

The third PlayList from the left is configured of two PlayItems, and a part of the AV stream included in the left Clip and a part of the AV stream included in the right Clip are referred to by the two PlayItems, respectively.

For example, when the left PlayItem included in the first PlayList from the left is designated to be reproduced by a disc navigation program, the first half of the AV stream included in the left Clip, which is referred to by the PlayItem, is reproduced.

A reproduction path created by arrangement of one or more PlayItems in PlayList is denoted as Main Path. Further, a reproduction path created by arrangement of one or more SubPlayItems in parallel with Main Path in PlayList is denoted as Sub Path.

Figure 11:
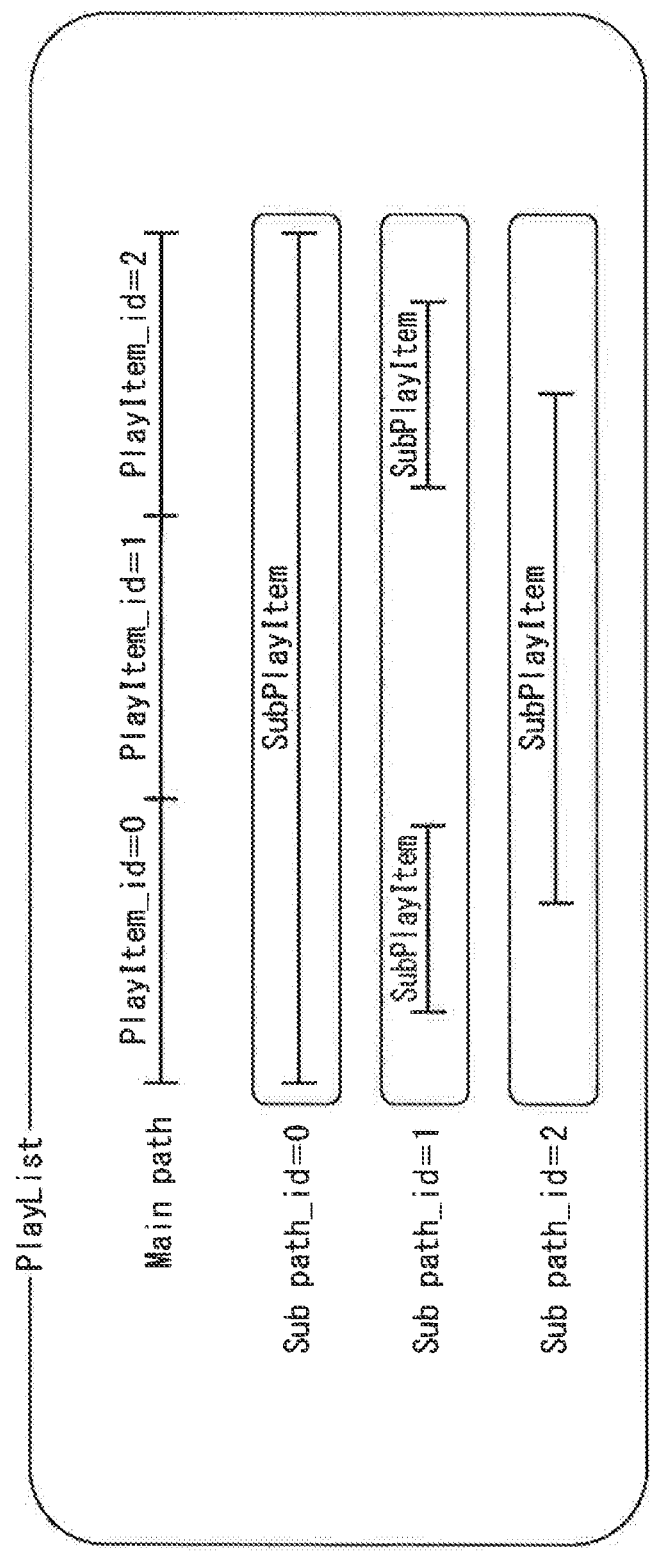
FIG. 11 is a diagram illustrating the structures of a Main Path and Sub Paths.

FIG. 11 is a diagram illustrating the structures of Main Path and Sub Paths.

PlayList has one Main Path and one or more Sub Paths. PlayList of FIG. 11 has one Main Path created by arrangement of three PlayItems, and three Sub Paths.

PlayItems configuring Main Path are sequentially set with IDs from the head, respectively. Sub Paths are sequentially set with the IDs of Subpath_id=0, path_id=1, and Subpath_id=2 from the head, respectively.

In the example of FIG. 11, one SubPlayItem is included in Sub Path with Subpath_id=0, and two SubPlayItems are included in Sub Path with Subpath_id=1. Further, one SubPlayItem is included in Sub Path with Subpath_id=2.

At least a video stream (main image data) is included in an AV stream referred to by one PlayItem. One or more audio streams reproduced at the same timing as (in synchronization with) the video stream included in an AV stream may or may not be included in the AV stream.

One or more streams of bitmap subtitles data (Presentation Graphic (PG)) reproduced in synchronization with the video stream included in an AV stream may or may not be included in the AV stream.

One or more streams of interactive graphic (IG) reproduced in synchronization with the video stream included in an AV stream, file may or may not be included in the AV stream. The IG stream is used for displaying graphics such as buttons operated by the user.

A video stream and an audio stream, a PG stream, and an IG stream which are reproduced in synchronization therewith are multiplexed on an AV stream referred to by one PlayItem.

Further, one SubPlayItem refers to the video stream, the audio stream, the PG stream, and the like in a different stream from the AV stream referred to by PlayItem.

In this way, an AV stream is reproduced by use of PlayList and Clip Information. Further, an AV stream is reproduced by use of information such as Index table described below. Reproduction management information used for managing reproduction of an AV stream as contents, such as index table, PlayList, and Clip Information, is denoted as Data Base information as needed.

Figure 12:
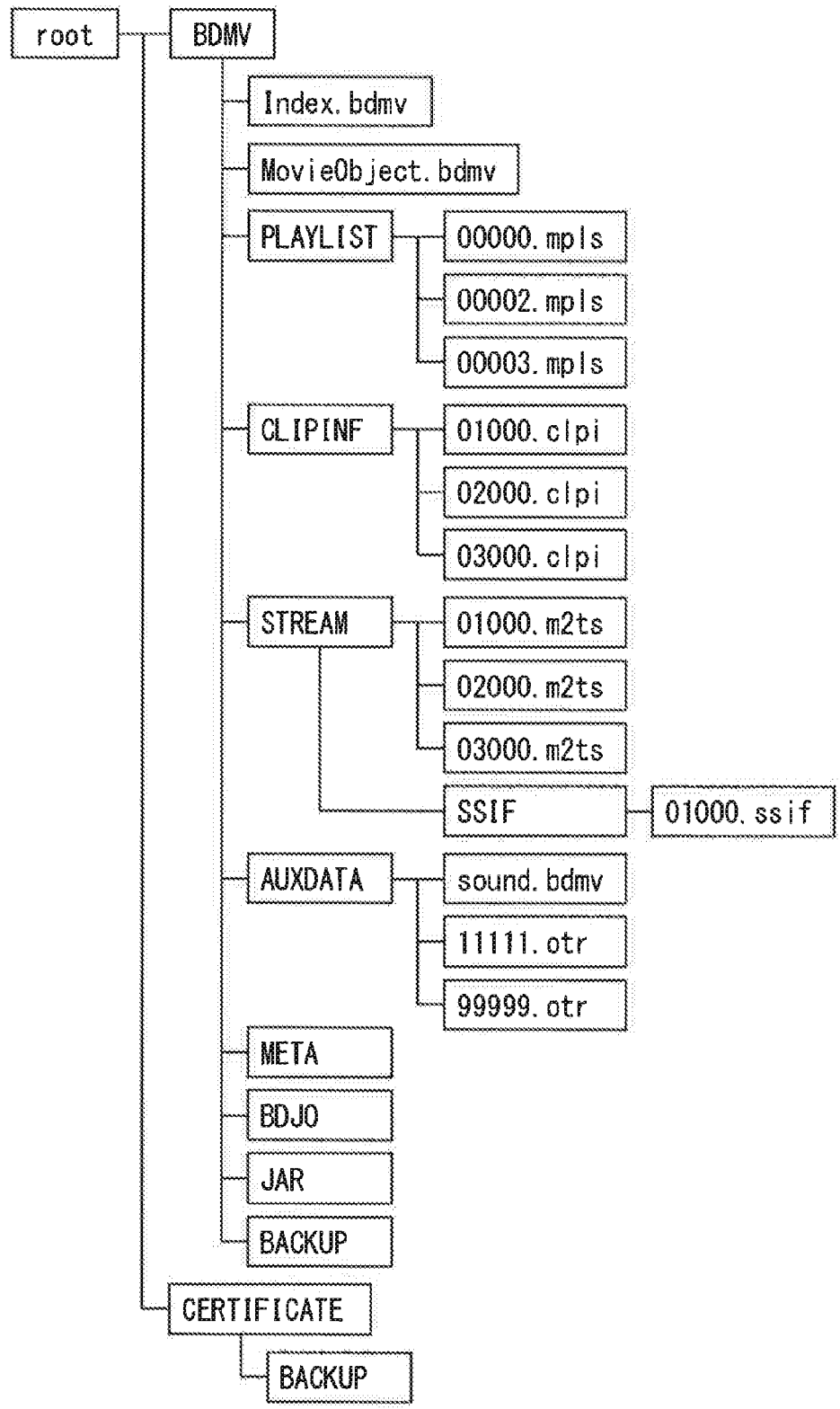
FIG. 12 is a diagram illustrating an exemplary management structure of files recorded in a disc.

FIG. 12 is a diagram illustrating an exemplary management structure of files recorded on the disc 11.

Each file recorded in the disc 11 is managed in a hierarchical manner in a directory structure. One root directory is created on the disc 11.

A BDMV directory is arranged under the root directory.

An Index table file set with the name of "Index.bdmv" and a MovieObject file set with the name of "MovieObject.bdmv" are stored under the BDMV directory. Index table is described in the Index table file.

A PLAYLIST directory, a CLIPINF directory, a STREAM directory, and the like are provided under the BDMV directory.

PlayList files describing PlayLists therein are stored in the PLAYLIST directory. Each PlayList file is set with a name in a combination of five-digit number and extension ".mpls." The three PlayList files illustrated in FIG. 12 are set with the file names of "00000.mpls," "00001.mpls," and "00002.mpls," respectively.

Clip Information files are stored in the CLIPINF directory. Each Clip Information file is set with a name in a combination of five-digit number and extension ".clpi." The three Clip Information files in FIG. 12 are set with the file names of "01000.clpi," "02000.clpi," and "03000.clpi," respectively.

AV stream files are stored in the STREAM directory. Each AV stream file is set with a name in a combination of five-digit number and extension "m2ts." The three AV stream files in FIG. 12 are set with the file names of "01000.m2ts," "02000.m2ts," and "03000.m2ts," respectively.

A Clip Information file and an AV stream file, which are set with the file names of the same five-digit number, configure on Clip. The clip Information file with "01000.clpi" is used while the AV stream file with "01000.m2ts" is reproduced, and the Clip Information file with "02000.clpi" is used while the AV stream file with "02000.m2ts" is reproduced.

<Exemplary Syntax of PlayList>

A syntax of PlayList describing information used for reproducing a HDR video will be described herein. As described above, PlayList is information defining one reproduction sequence configured of PlayItem or the like. A plurality of PlayLists may be prepared in one disc. When a plurality of PlayLists are prepared, a PlayList to be reproduced is determined depending on a user operation or the like.

FIG. 13 is a diagram illustrating a syntax of PlayList.

A file describing PlayList therein is a file set with the extension ".mpls" stored in the PLAYLIST directory of FIG. 12.

A parameter for PlayList reproduction control, such as reproduction restriction, is stored in AppInfoPlayList( ).

A parameter for Main Path or Sub Path is stored in PlayList( ).

PlayList mark information, or mark information as jump destination (jump point) in a user operation or command to instruct chapter jumping is stored in PlayListMark( ).

FIG. 14 is a diagram illustrating an exemplary syntax of AppInfoPlayList( ) of FIG. 13.

The information used for reproducing a HDR video such as HDR_flag, option_A_HDR_flag, option_B_HDR_flag, and HDR_compatible_type is described in AppInfoPlayList( ) of FIG. 14.

FIG. 15 is a diagram illustrating the meanings of values of respective items of information.

HDR_flag is a 1-bit flag indicating whether a Mandatory HDR video is included in the BD (the same disc as the disc in which PlayList describing the HDR_flag therein is recorded).

HDR_flag of 0b indicates that a Mandatory HDR video is not included, and HDR_flag of 1b indicates that a Mandatory HDR video is included.

option_A_HDR_flag is a 1-bit flag indicating whether an Option A HDR video is included in the BD (the same disc as the disc in which PlayList describing the option_A_HDR_ flag therein is recorded).

option_A_HDR_of 0b indicates that an Option A HDR video is not included, and option_A_HDR_flag of 1b indicates that an option_A_HDR video is included.

option_B_HDR_flag is a 1-bit flag indicating whether an Option B HDR video is included in the BD (the same disc as the disc in which PlayList describing the option_B_HDR_ flag therein is recorded).

option_B_HDR_flag of 0b indicates that an Option B HDR video is not included, and option_B_HDR_flag of 1b indicates that an Option B HDR video is included.

The author of the contents can designate any kind of HDR video recorded in the BD by use of HDR_flag, option_A_HDR_flag, and option_B_HDR_flag.

HDR_compatible_type is 2-bit information indicating a form of providing a SDR video compatible with a HDR video or a form of providing a HDR video compatible with a SDR video.

HDR_compatible_type of 00b indicates that a compatible video is not prepared.

HDR_compatible_type of 01b indicates that an encoding stream of a compatible video is included in Clip indicated by the PlayList (the AV stream of Clip reproduced by a reproduction sequence defined by PlayList describing the HDR_compatible_type therein).

HDR_compatible_type of 10b indicates that an encoding stream of a compatible video is prepared in Clip indicated by another PlayList. The values 01b and 10b of HDR_compatible_type indicate that the compatible HDR video and SDR video are prepared in the same disc.

HDR_compatible_type of lib indicates that an encoding stream of a compatible video is prepared in another disc.

The author of the contents can designate a form of providing a compatible video by use of HDR_compatible_type.

Figure 16:
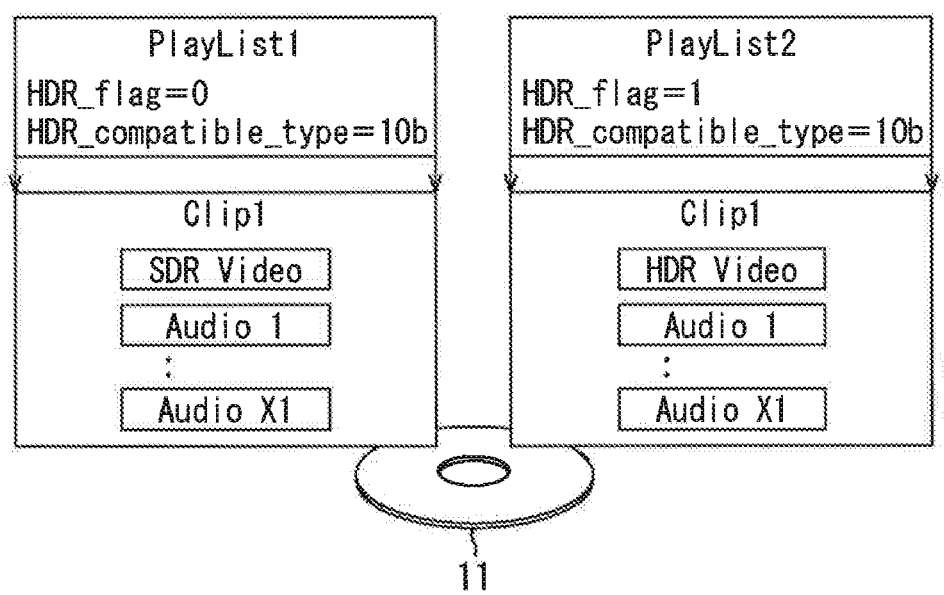
FIG. 16 is a diagram illustrating a first specific example of the values of HDR_flag and HDR_compatible_type.

FIG. 16 is a diagram illustrating a first specific example of the values of HDR_flag and HDR_compatible_type.

When a form of recording a HDR video and a SDR video is the form of FIG. 7, HDR_flag of PlayList1 referring to the AV stream including the encoding stream of the SDR video is set at 0, and HDR_compatible_type is set at 10b.

HDR_flag of 0 of PlayList1 indicates that the encoding streamer the HDR video is not included in the AV stream referred to by PlayList1. HDR_compatible_type of 10b of PlayList1 indicates that the HDR video compatible with the SDR video included in the AV stream referred to by PlayList1 is prepared in the AV stream referred to by PlayList2 as another PlayList.

Further, HDR_flag of PlayList2 referring to the AV stream including the encoding stream of the HDR video is set at 1, and HDR_compatible_type is set at 10b.

HDR_flag of 1 of PlayList2 indicates that the encoding stream of the HDR video is included in the AV stream referred to by PlayList2. Further, the HDR_compatible_type of 10b of PlayList2 indicates that the SDR video compatible with the HDR video included, in the AV stream referred to by PlayList2 is prepared in the AV stream referred to by PlayList1 as another PlayList.

Figure 17:
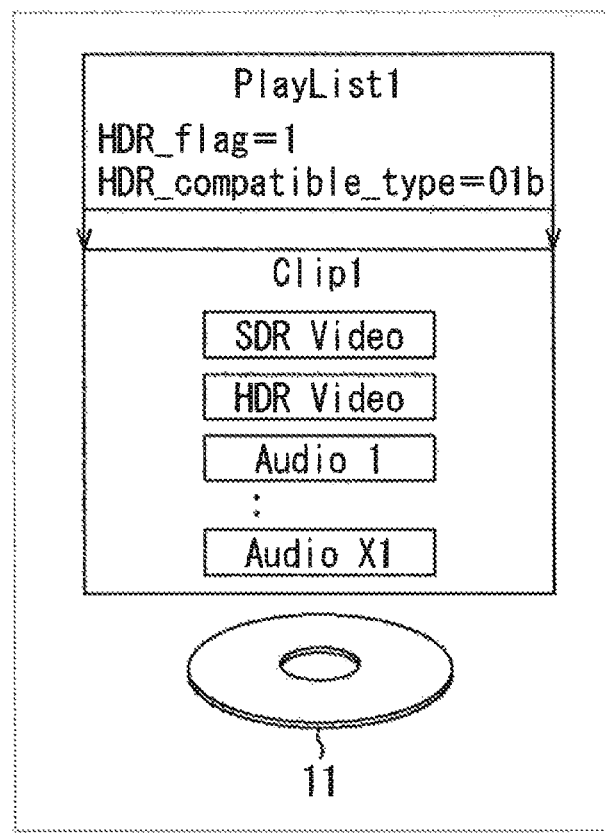
FIG. 17 is a diagram illustrating a second specific example of the values of HDR_flag and HDR_compatible_type.

FIG. 17 is a diagram illustrating a second specific example of the values of HDR_flag and HDR_compatible_type.

When a form of recording a HDR video and a SDR video is the form of FIG. 8, the HDR_flag of PlayList1 referring to the AV stream including the encoding stream of the SDR video and the encoding stream of the HDR video is set at 1, and HDR_compatible_type is set at 01b.

HDR_flag of 1 of PlayList1 indicates that the encoding stream of the HDR video is included in the AV stream referred to by PlayList1. HDR_compatible_type of 01b of PlayList1 indicates that the compatible SDR video and HDR video are prepared in the AV stream referred to by the same PlayList1.

Figure 18:
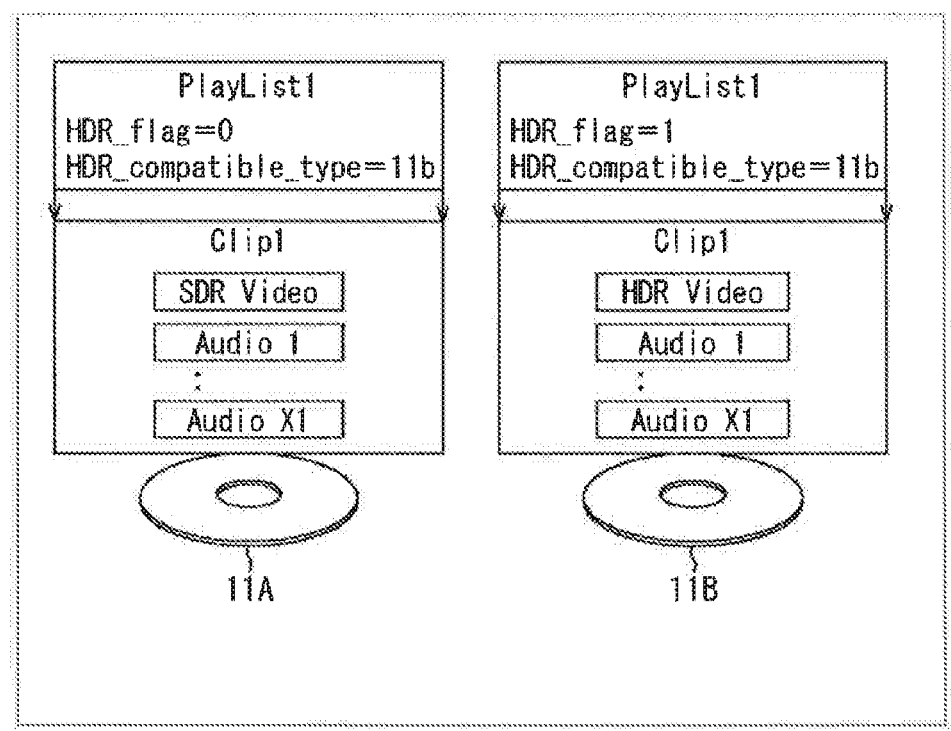
FIG. 18 is a diagram illustrating a third specific example of the values of HDR_flag and HDR_compatible_type.

FIG. 18 is a diagram illustrating a third specific example of the values of HDR_flag and HDR compatible_type.

When a form of recording a HDR video and a SDR video is the form of FIG. 9, HDR_flag of PlayList1 recorded in the disc 11A is set at 0, and HDR_compatible_type is set at 11b. Further, HDR_flag of PlayList1 recorded in the disc 11R is set at 1, and HDR_compatible_type is set at 11b.

HDR_flag of 0 of PlayList1 recorded in the disc 11A indicates that the encoding stream of the HDR video is not included in the AV stream referred to by PlayList1. HDR_compatible_type of 11b of PlayList1 indicates that the HDR video compatible with the SDR video included in the AV stream referred to by PlayList1 is prepared in another disc 11B.

On the other hand, HDR_flag of 1 of PlayList1 recorded in the disc 11B indicates that the encoding stream of the HDR video is included in the AV stream referred to by PlayList1. Further, HDR_compatible_type of 11b of PlayList1 indicates that the SDR video compatible with the HDR video included in the AV stream referred to by PlayList1 is prepared in another disc 11A.

A set of HDR_flag and HDR_compatible_type may be described in other area in PlayList, such as ExtensionData( ), not in AppInfoPlayList( ). Further, it may be described in other Data Base information such as Index table or Clip Information, not in PlayList.

<<3. Configurations of Apparatuses>>

The configurations of the respective apparatuses will be described herein.

<Configuration of Recording Apparatus 1>

Figure 19:
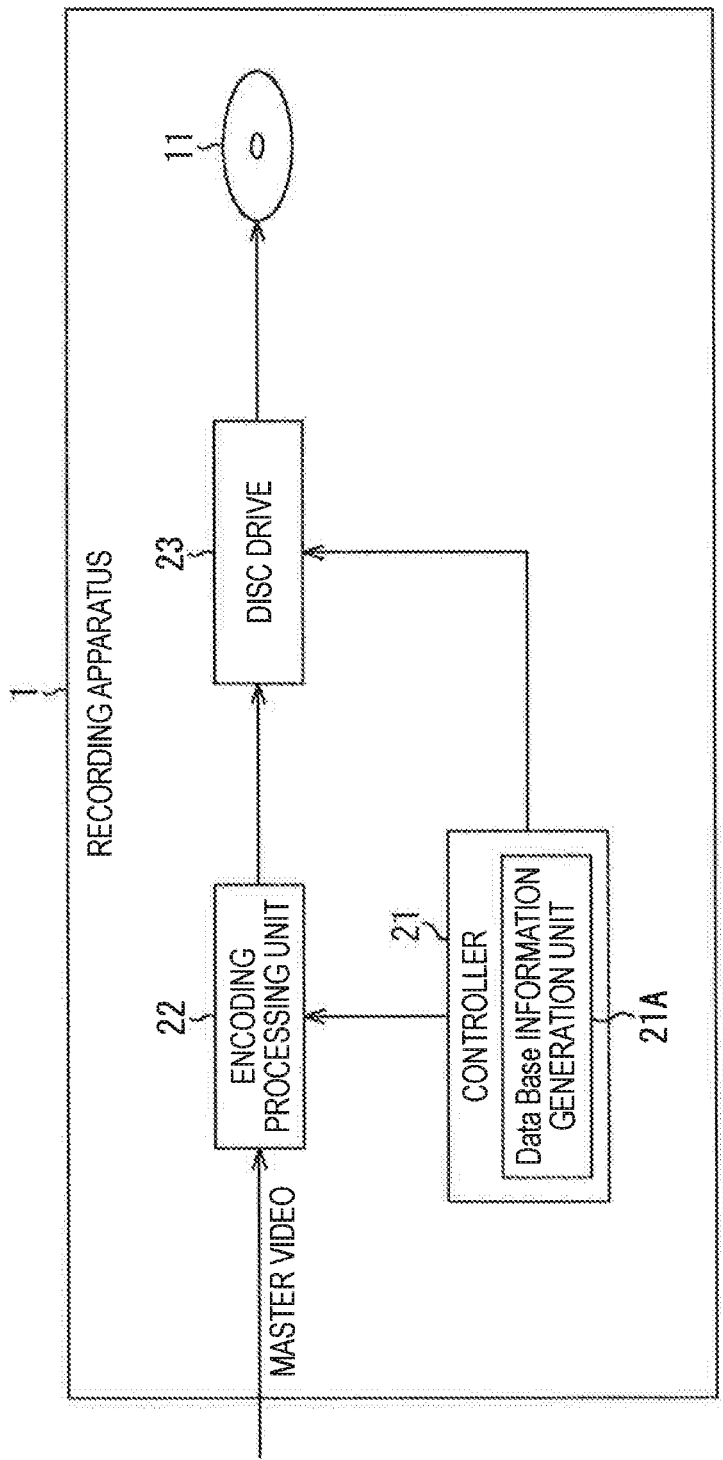
FIG. 19 is a block diagram illustrating an exemplary configuration of a recording apparatus.

FIG. 19 is a block diagram illustrating an exemplary configuration of the recording apparatus 1.

The recording apparatus 1 is configured of a controller 21, an encoding processing unit 22, and a disc drive 23. A master video is input in the encoding processing unit 22.

The controller 21 is configured of a central processing unit (CPU), a read only memory (ROM), a random access memory (RAM), and the like. The controller 21 executes predetermined programs to control the operations of the entire recording apparatus 1.

A predetermined program is executed in the controller 21 so that a Data Base information generation unit 21A is realized. The Data Base information generation unit 21A generates Data Base information such as Index table, PlayList, and Clip Information, and outputs it to the disc drive 23.

The encoding processing unit 22 generates and multiplexes streams of various HDR videos and SDR videos on the basis of the master video, thereby generating an AV stream configuring Clip. An audio stream reproduced in synchronization with a video, or the like is included in the AV stream. The encoding processing unit 22 outputs the generated AV stream to the disc drive 23.

The disc drive 23 records each file of the Data Base information supplied from the controller 21 and a file of the AV stream supplied from the encoding processing unit 22 in the disc 11 according to the directory structure of FIG. 12.

Figure 20:
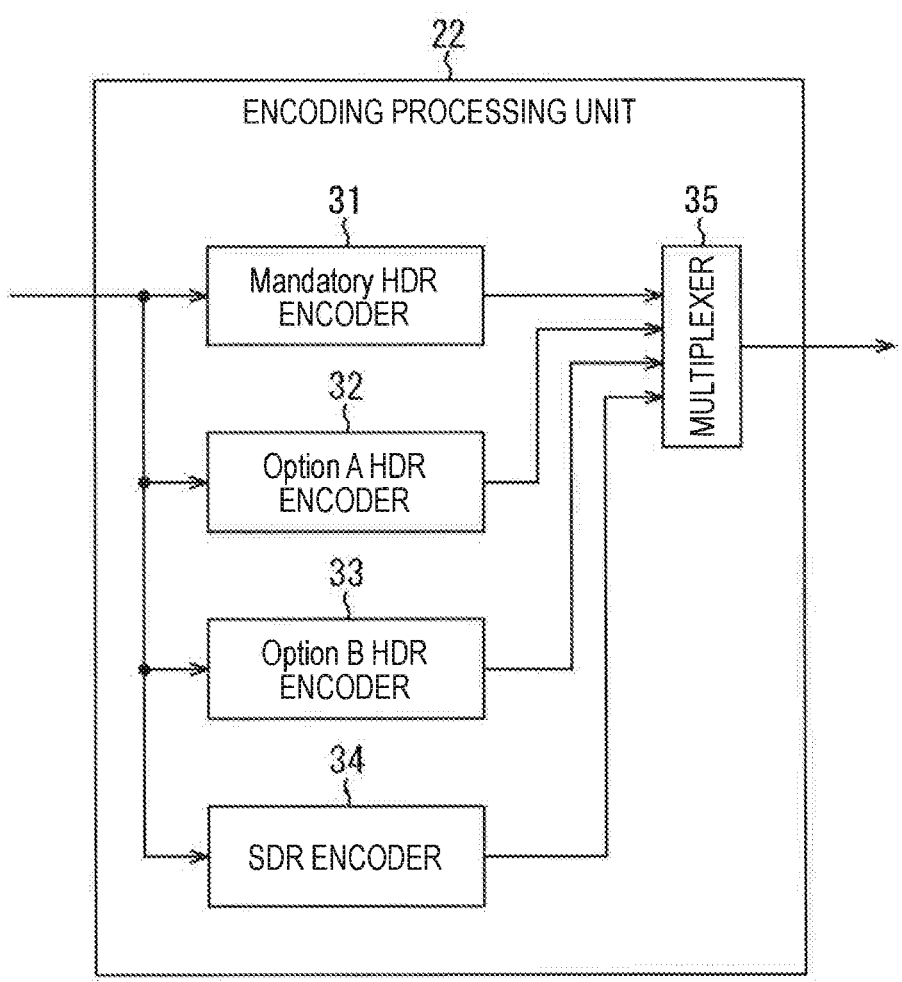
FIG. 20 is a block diagram illustrating an exemplary configuration of an encoding processing unit of FIG. 19.

FIG. 20 is a block diagram illustrating an exemplary configuration of the encoding processing unit 22 of FIG. 19.

The encoding processing unit 22 is configured of a Mandatory HDR encoder 31, an Option A HDR encoder, 32, an Option B HDR encoder 33, a SDR encoder 34, and a multiplexer 35. The master video input in the recording apparatus 1 is supplied to the Mandatory HDR encoder 31, the Option A HDR encoder 32, the Option B HDR encoder 33, and the SDR encoder 34.

The Mandatory HDR encoder 31 performs a signal processing using the Mandatory HDR technique in the BD format on the master video, thereby generating a Mandatory HDR video. The Mandatory HDR encoder 31 encodes the Mandatory HDR video in a predetermined encoding system such as high efficiency video coding (HEVC), and outputs a Mandatory HDR video stream acquired by the encoding to the multiplexer 35.

The Option A HDR encoder 32 performs a signal processing using the Option A HDR technique in the BD format on the master video, thereby generating an Option A HDR video. The Option A HDR encoder 32 encodes the Option A HDR video in a predetermined encoding system, and outputs an Option A HDR video stream acquired by the encoding to the multiplexer 35.

The Option B HDR encoder 33 performs a signal processing using the Option B HDR technique in the BD format on the master video, thereby generating an Option B HDR video. The Option B HDR encoder 33 encodes the Option B HDR video in a predetermined encoding system, and outputs an Option B HDR video stream acquired by the encoding to the multiplexer 35.

The SDR encoder 34 compresses a dynamic range of the master video thereby to generate a SDR video. The SDR encoder 34 encodes the SDR video in a predetermined encoding system, and outputs a SDR video stream acquired by the encoding to the multiplexer 35.

The operation of each encoder is controlled by the controller 21. That is, the processing by the Mandatory HDR encoder 31 is performed when any kind of HDR disc is generated. Further, the processing by the Option A HDR encoder 32 is performed when a Mandatory/Option A HDR disc or a Mandatory/Option A/Option B HDR disc is generated. The processing by the Option B HDR encoder 33 is performed when a Mandatory/Option B HDR disc or a Mandatory/Option A/Option B HDR disc is generated. The processing by the SDR encoder 34 is performed when a SDR disc recording a SDR video therein or a HDR disc recording a SDR video and a HDR video therein is generated.

The multiplexer 35 multiplexes the video stream supplied from each encoder together with the audio stream and the like, thereby generating an AV stream. The multiplexer 35 outputs the generated AV stream to the disc drive 23.

<Configuration of Reproducing Apparatus 2>

Figure 21:
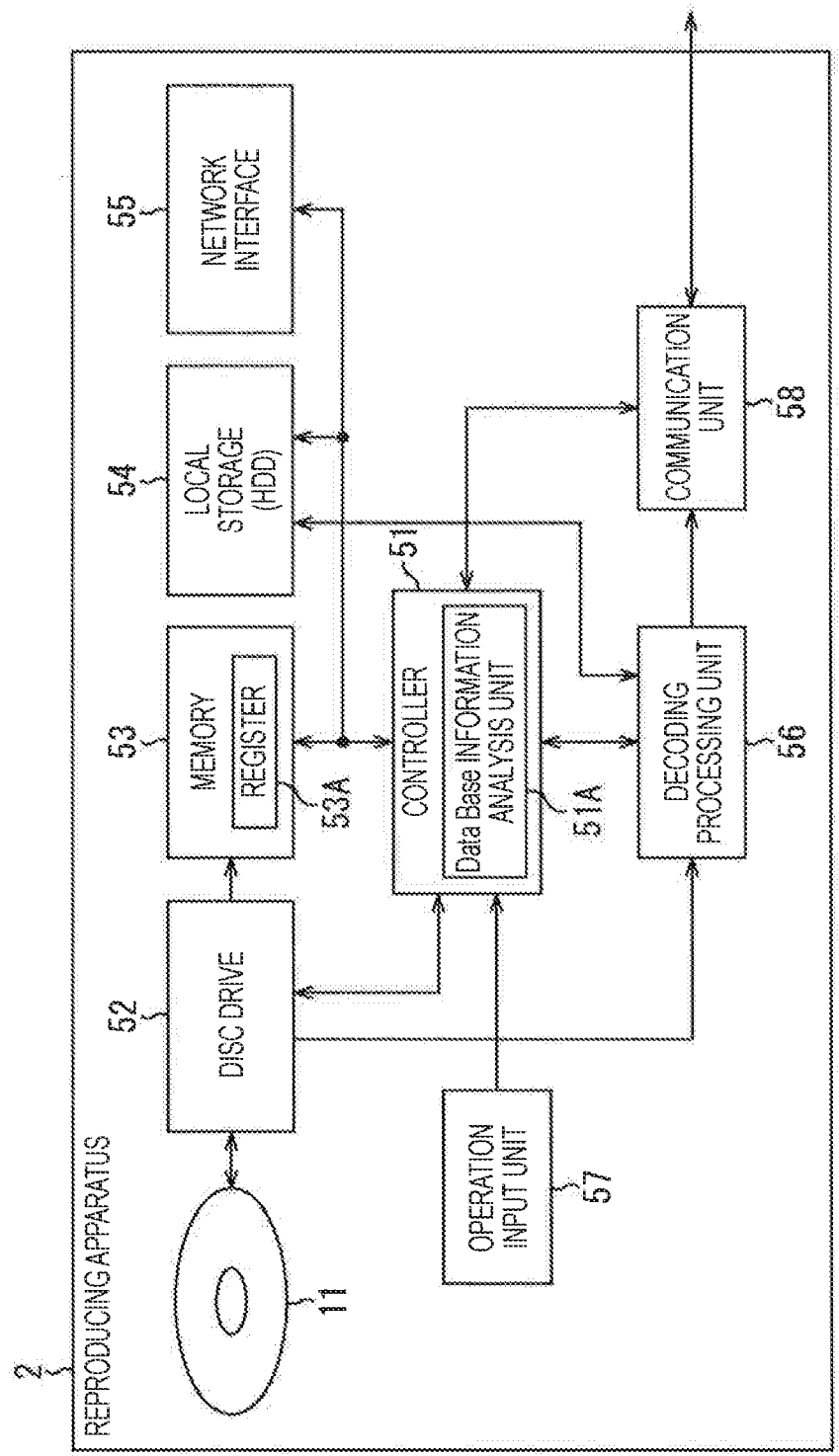
FIG. 21 is a block diagram illustrating an exemplary configuration of a reproducing apparatus.

FIG. 21 is a block diagram illustrating an exemplary configuration of the reproducing apparatus 2.

The reproducing apparatus 2 is configured of a controller 51, a disc drive 52, a memory 53, a local storage 54, a network interface 55, a decoding processing unit 56, an operation input unit 57, and a communication unit 58.

The controller 51 is configured of a CPU, a ROM, a RAM, and the like. The controller 51 executes predetermined programs to control the operations of the entire reproducing apparatus 2.

A predetermined program is executed in the controller 51 so that a Data Base information analysis unit 51A is realized. The Data Base information analysis unit 51A analyzes the Data Base information such as Index table, PlayList, and Clip Information.

The disc drive 52 reads and acquires data from the disc 11, and outputs the acquired data to the controller 51, the memory 53, or the decoding processing unit 56. For example, the disc drive 52 outputs the Data Base information to the controller 51, and outputs the AV stream to the decoding processing unit 56.

The memory 53 stores data or the like required by the controller 51 for performing various kinds of processing. A register 53A as player status register (PSR) is formed in the memory 53.

Various items of information on the functions of the reproducing apparatus 2 as BD player or the current setting of the reproducing apparatus 2 are stored in the register 53A. For example, information on the reproduction capability of the reproducing apparatus 2 and information on the display capability of the display of the display apparatus 3 are stored in the register 53A.

A kind of HDR video reproducible by the reproducing apparatus 2 is specified by the information on the reproduction capability of the reproducing apparatus 2. Further, a kind of HDR video displayable on the display is specified by the information on the reproduction capability of the display of the display apparatus 3. The information stored in the register 53A is referred to when the disc 11 is reproduced.

The local storage 54 is configured of a hard disk drive (HDD), for example. Streams downloaded from a server, and the like are recorded in the local storage 54.

The network interface 55 makes communication with a server via a network such as Internet, and supplies data downloaded from the server to the local storage 54.

The decoding processing unit 56 decodes the HDR video or the SDR video multiplexed on the AV stream supplied from the disc drive 52, and outputs the video data acquired by the decoding to the communication unit 58.

The operation input unit 57 is configured of an input device such as buttons, keys, or touch panel, or a reception unit for receiving a signal such as infrared ray transmitted from a predetermined remote commander. The operation input unit 57 detects a user operation, and supplies a signal indicating the contents of the detected operation to the controller 51.

The communication unit 58 makes communication with the display apparatus 3 via the cable 4. For example, the communication unit 58 acquires the information on the display capability of the display of the display apparatus 3, and outputs it to the controller 51. Further, the communication unit 58 outputs the video data supplied from the decoding processing unit 56 to the display apparatus 3.

Figure 22:
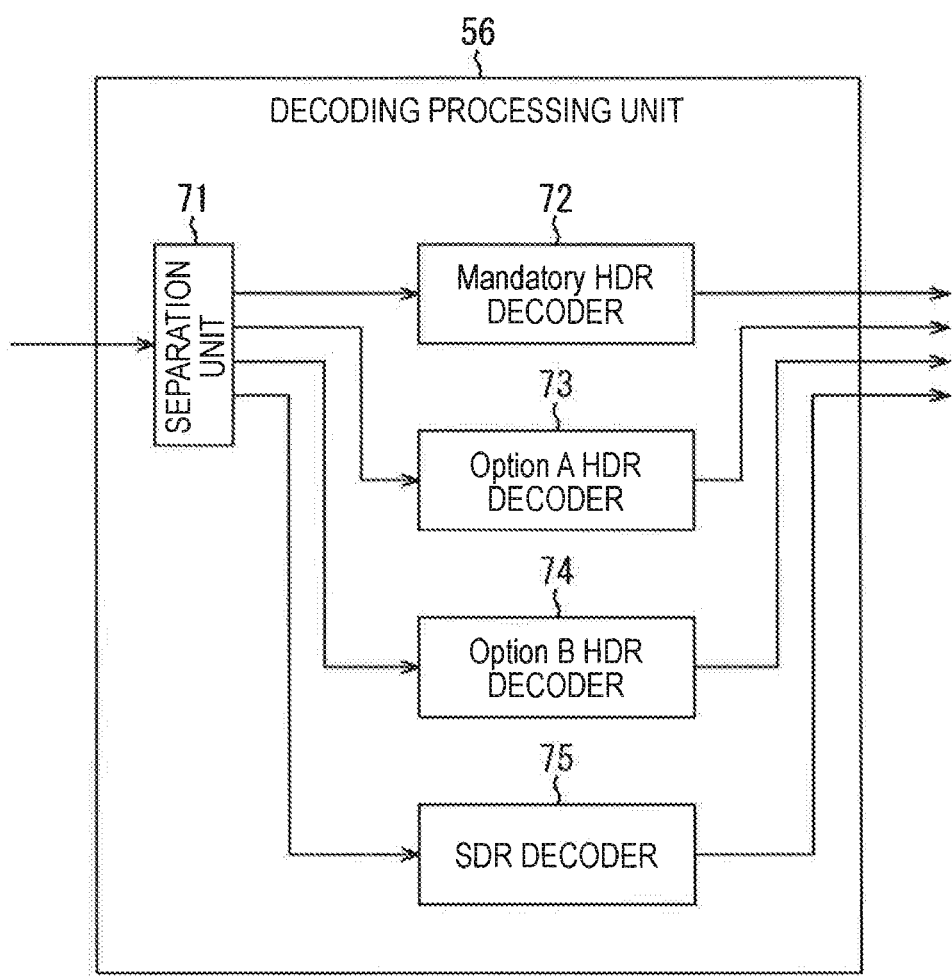
FIG. 22 is a block diagram illustrating an exemplary configuration of a decoding processing unit of FIG. 21.

FIG. 22 is a block diagram illustrating an exemplary configuration of the decoding processing unit 56 of FIG. 21.

The decoding processing unit 56 is configured of a separation unit 71, a Mandatory HDR decoder 72, an Option A HDR decoder 73, an Option B HDR decoder 74, and a SDR decoder 75. The reproducing apparatus 2 having the Mandatory HDR decoder 72, the Option A HDR decoder 73, and the Option B HDR decoder 74 is a Mandatory/Option A/Option B HDR-compatible Player. The AV stream read by the disc drive 52 is input in the separation unit 71.

The separation unit 71 separates the video stream to be reproduced from the AV stream under control of the controller 51, and outputs it to each decoder. When the Mandatory HDR video is to be reproduced, the separation unit 71 separates the Mandatory HDR video stream and outputs it to the Mandatory HDR decoder 72. Further, when the Option A HDR video is to be reproduced, the separation unit 71 separates the Option A HDR video stream and outputs it to the Option A HDR decoder 73. When the Option B HDR video is to be reproduced, the separation unit 71 separates the Option B HDR video steam, and outputs it to the Option B HDR decoder 74. When the SDR video is to be reproduced, the separation unit 71 separates the SDR video stream, and outputs it to the SDR decoder 75.

The Mandatory HDR decoder 72 decodes the Mandatory HDR video stream supplied from the separation unit 71, and outputs the data of the Mandatory HDR video acquired by the decoding.

The Option A HDR decoder 73 decodes the Option A HDR video stream supplied from the separation unit 71, and outputs the data of the Option A HDR video acquired by the decoding.

The Option B HDR decoder 74 decodes the Option B HDR video stream supplied from the separation unit 71, and outputs the data of the Option B HDR video acquired by the decoding.

The SDR decoder 75 decodes the SDR video stream supplied from the separation unit 71, and outputs the data of the SDR video acquired by the decoding.

Configuration of Display Apparatus 3>

Figure 23:
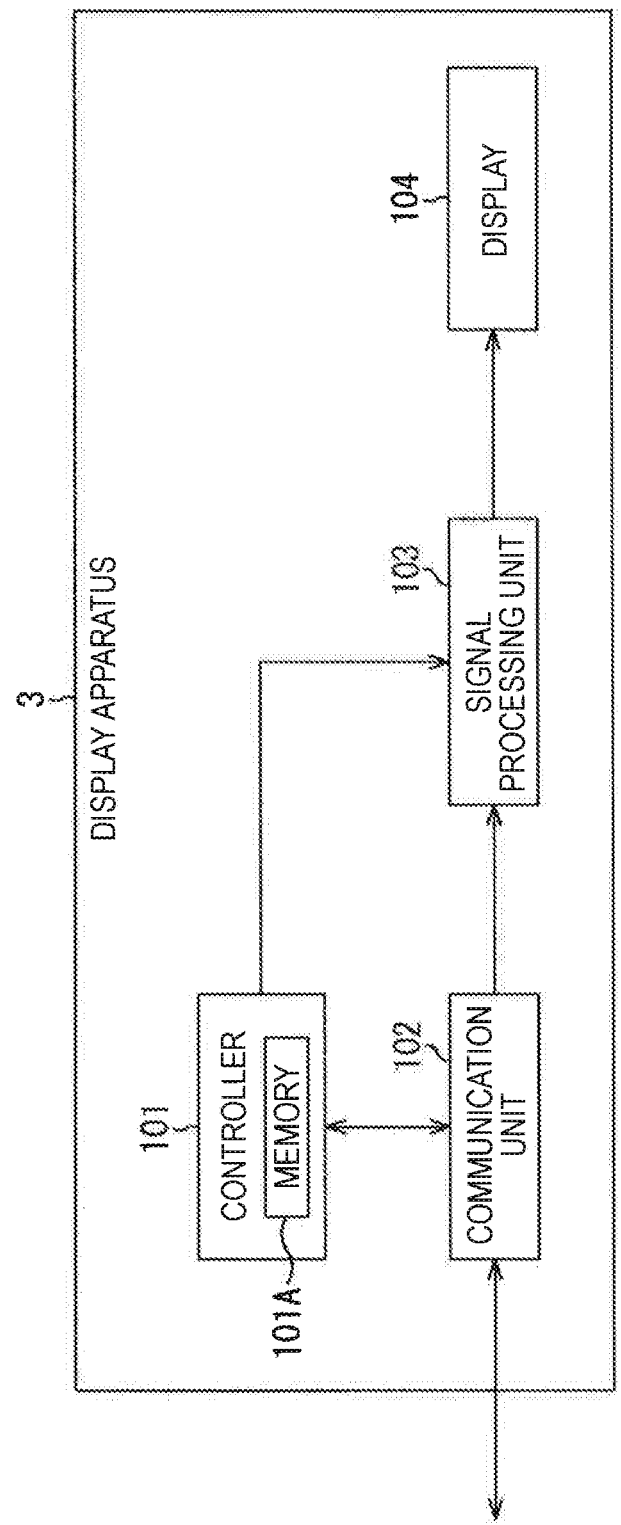
FIG. 23 is a block diagram illustrating an exemplary configuration of a display apparatus.

FIG. 23 is a block diagram illustrating an exemplary configuration of the display apparatus 3.

The display apparatus 3 is configured of a controller 101, a communication unit 102, a signal processing unit 103, and a display 104. The controller 101 has a memory 101A.

The controller 101 is configured of a CPU, a ROM, a RAM, and the like. The controller 101 executes predetermined programs to control the operations of the entire display apparatus 3.

For example, the controller 101 stores information on the display capability of the display 104 in the memory 101A for management. During authentication for the reproducing apparatus 2, the controller 101 outputs the information stored in the memory 101A to the communication unit 102, which is transmitted to the reproducing apparatus 2 by use of EDID. The display capability of the display 104 is specified by the reproducing apparatus 2 on the basis of EDID.

The communication unit 102 makes communication with the reproducing apparatus 2 via the cable 4. The communication unit 102 receives the video data transmitted from the reproducing apparatus 2, and outputs it to the signal processing unit 103. Further, the communication unit 102 transmits the information supplied from the controller 101 to the reproducing apparatus 2.

The signal processing unit 103 processes the video data supplied from the communication unit 102, and displays the video on the display 104.

<<4. Operations of Apparatuses>>

The operations of each apparatus having the above configuration will be described herein.

<Processing of Recording Apparatus>

Figure 24:
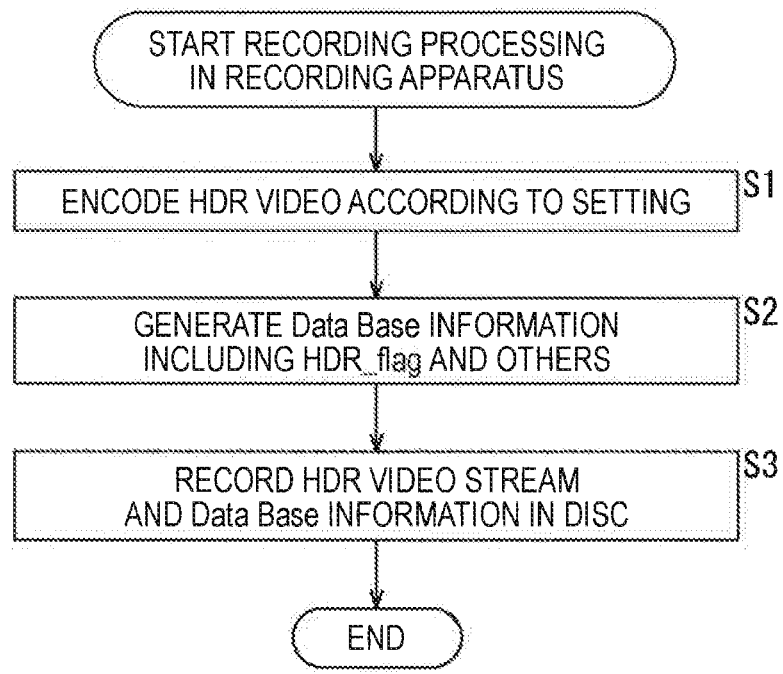
FIG. 24 is a flowchart for explaining a record processing of the recording apparatus.

A record processing of the recording apparatus 1 will be first described with reference to the flowchart of FIG. 24. The processing of FIG. 24 is started when master video data is input, for example.

In step S1, the encoding processing unit 22 encodes the HDR video according to the setting. That is, when it is assumed that the content author as the user of the recording apparatus 1 generates a Mandatory HDR disc, the Mandatory HDR encoder 31 performs encoding thereby to generate a Mandatory HDR video stream. Further, for example, when it is assumed that a Mandatory/Option A HDR disc is generated, the Mandatory HDR encoder 31 and the Option A HDR encoder 32 perform, encoding thereby to generate a Mandatory HDR video stream and an Option A HDR video stream, respectively. The encoding processing unit 22 generates a SDR video stream as needed. The generated video streams are multiplexed thereby to generate an AV stream.

In step S2, the Data Base information generation unit 21A in the controller 21 generates Data Base information such, as PlayList including each item of information of FIG. 15.

In step S3, the disc drive 23 records files of the Data Base information and a file of the AV stream in the disc 11. Thereafter, the processing ends.

<Processing of Reproducing Apparatus>

A processing of acquiring the information on the display capability of the display in the reproducing apparatus 2 will be described below with reference to the flowchart of FIG. 25.

Figure 25:
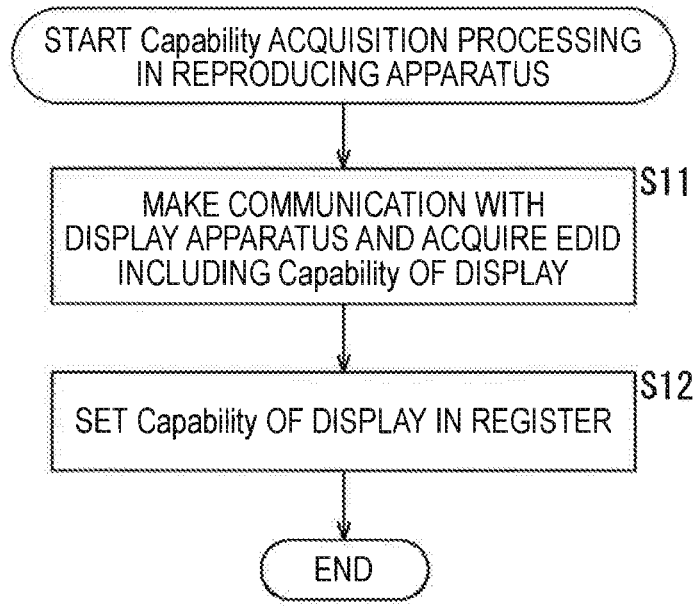
FIG. 25 is a flowchart for explaining a display capability acquisition processing of the reproducing apparatus.

The processing of FIG. 25 is started when the reproducing apparatus 2 is connected to the display apparatus 3 via the cable 4 and the power supply is turned on, for example.

In step S11, the communication unit 58 makes communication with the display apparatus 3, and acquires EDID including the information on the display capability of the display 104. The communication unit 58 outputs the information on the display capability of the display 104 to the controller 51.

In step S12, the controller 51 recognizes the display capability of the display 104 on the basis of the information supplied from the communication unit 58, and sets the information on the display capability in the register 53A. Thereafter, the processing ends.

Figure 26:
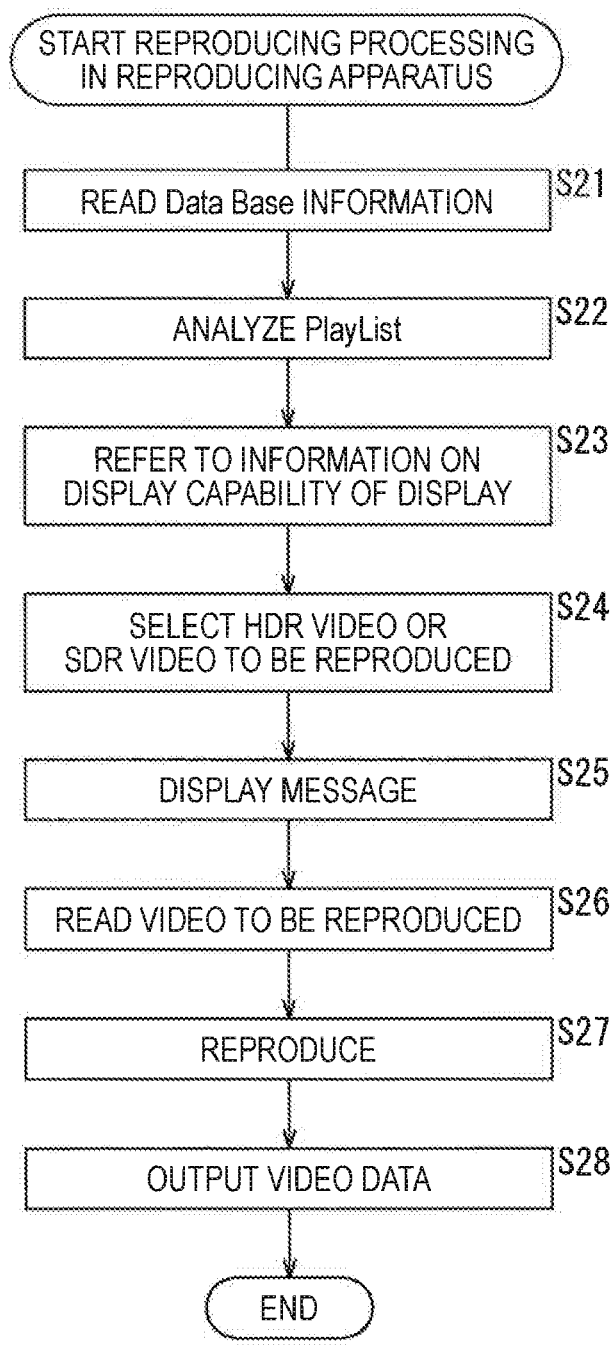
FIG. 26 is a flowchart for explaining a reproduction processing of the reproducing apparatus.

A processing of reproducing a HDR video in the reproducing apparatus 2 will be described below with reference to the flowchart of FIG. 26. The processing of FIG. 26 is performed after the processing of FIG. 25 is performed.

In step S21, the controller 51 controls the disc drive 52 and causes it to read the Data Base information from the disc 11. The Data Base information analysis unit 51A in the controller 51 acquires the Data Base information read by the disc drive 52.

In step S22, the Data Base information analysis unit 51A analyzes PlayList included in the acquired Data Base information, and refers to the respective items of information such as HDR_flag, option_A_HDR_flag, option_B_HDR_flag, and HDR_compatible_type.

In step S23, the controller 51 refers to the information on the display capability of the display 104 stored in the register 53A.

In step S24, the controller 51 selects a video to be reproduced according to a user operation or the like. For example, the controller 51 selects PlayList to be reproduced, and selects the HDR video or the SDR video to be reproduced included in Clip referred to by the PlayList according to a user operation on the menu screen.

In step S25, the controller 51 displays, on the display 104, a message depending on the kind of the selected video to be reproduced, the display capability of the display 104, and the value of HDR_compatible_type. Herein, when it is better to reproduce a compatible video not the selected video to be reproduced, a message for notifying a form of providing the compatible video is displayed.

For example, when a video to be reproduced is the HDR video and the display 104 is not for displaying the HDR video, the controller 51 displays a message for notifying a form of providing the compatible SDR video on the basis of the value of HDR_compatible_type.

Further, when a video to be reproduced is the SDR video and the display 104 is for displaying the HDR video, the controller 51 displays a message for notifying a form of providing the compatible HDR video on the basis of the value of HDR_compatible_type.

Additionally, a form of providing a compatible video may be notified via speech output, or may be notified via emitted LED provided on the casing of the reproducing apparatus 2, instead of being notified via a message.

In step S26, the controller 51 controls the disc drive 52 and causes it to read the AV stream including the video to be reproduced from the disc 11. The video to be reproduced is changed from the video selected in step S24 to the video compatible therewith as needed. The AV stream acquired by the disc drive 52 is supplied to the decoding processing unit 56.

In step S27, the decoding processing unit 56 decodes the video stream multiplexed on the AV stream supplied from the disc drive 52, and outputs the data of the HDR video or the data of the SDR video acquired by the decoding to the communication unit 58.

In step S28, the communication unit 58 outputs the data of the video supplied from the decoding processing unit 56 to the display apparatus 3. In the display apparatus 3 which receives the data output from the communication unit 58, the received data is subjected to the signal processing so that the HDR video or the SDR video is displayed on the display 104. A series of processing in steps S26 to S28 is continued until the content reproduction ends.

SPECIFIC EXAMPLES OF MESSAGE

First Specific Example of Message

Figure 27:
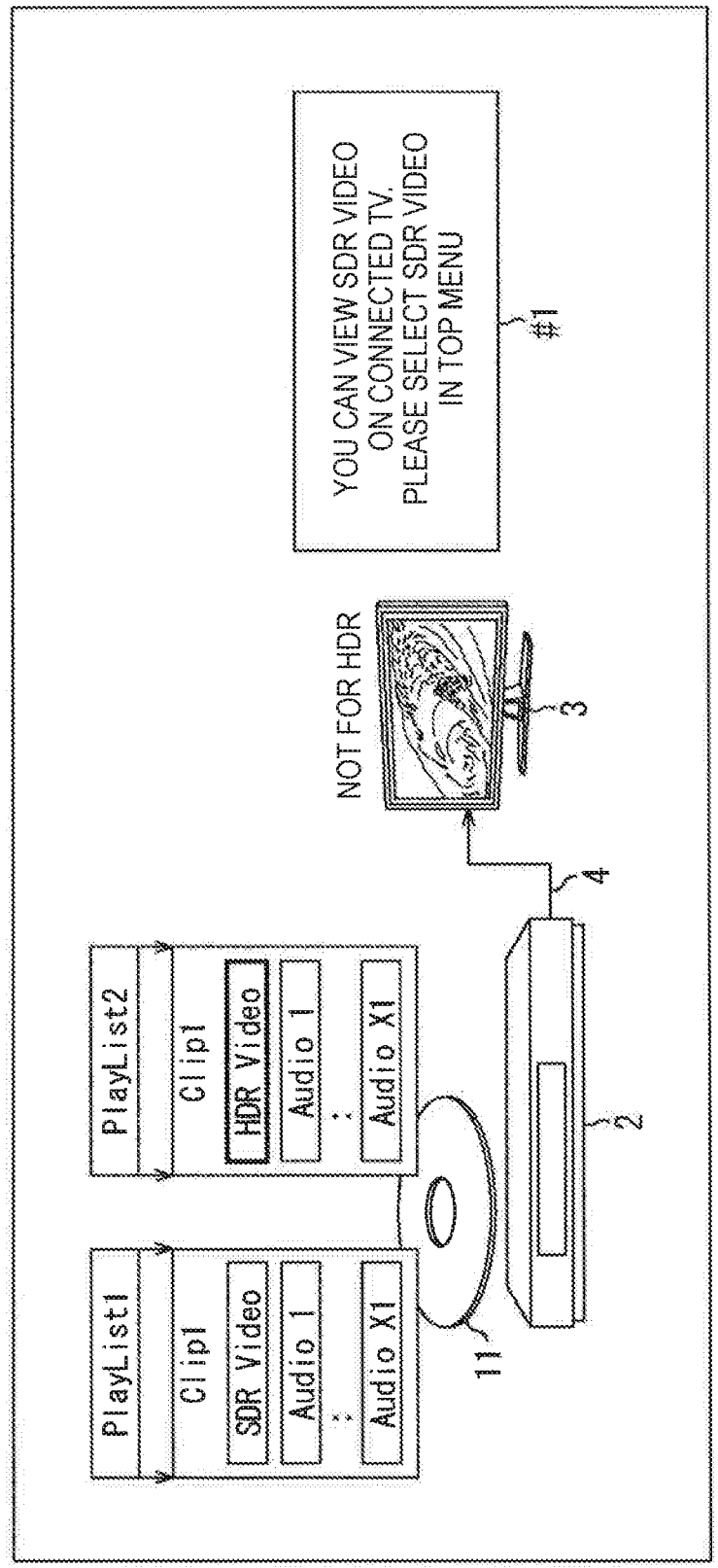
FIG. 27 is a diagram illustrating first exemplary display of a message.

FIG. 27 is a diagram illustrating a first specific example of a message displayed in the processing of FIG. 26.

A form of recording a HDR video and a SDR video illustrated in FIG. 27 is the same as the form illustrated in FIG. 7. The AV stream referred to by PlayList1 and the AV stream referred to by PlayList2 are recorded in the disc 11 inserted in the reproducing apparatus 2. The encoding stream of the SDR video is included in the AV stream referred to by PlayList1, and the encoding stream of the HDR video is included in the AV stream referred to by PlayList2.

As described with reference to FIG. 16, HDR_flag of PlayList1 is set at 0, and HDR_compatible_type is set at 10b. Further, HDR_flag of PlayList2 is set at 1, and HDR_compatible_type is set at 10b. The display 104 of the display apparatus 3 is assumed not to be for HDR video.

In this state, it is assumed that the HDR video to be reproduced included in the AV stream referred to by PlayList2 is selected as surrounded in a bold frame via an operation on the menu screen, for example (step S24). The selected HDR video to be reproduced cannot be displayed on the display 104 of FIG. 27.

In this case, the SDR video is selected from the menu screen so that a message #1 for notifying that the compatible SDR video can be viewed is displayed on the display 104 (step S25).

The an confirm that the compatible SDR video, which is recorded in the disc 11, is provided.

When the user displays the menu screen and selects the SDR video to be reproduced, the AV stream referred to by PlayList1 is read from the disc 11 (step S26). Further, the SDR video stream included in the read AV stream is reproduced so that the data of the SDR video is output from the reproducing apparatus 2 to the display apparatus 3 (steps S27 and S28).

The SDR video is displayed on the display 104 of the display apparatus 3 on the basis of the data supplied from the reproducing apparatus 2. The user cannot view the HDR video, but can view the SDR video compatible therewith.

Second Specific Example of Message

Figure 28:
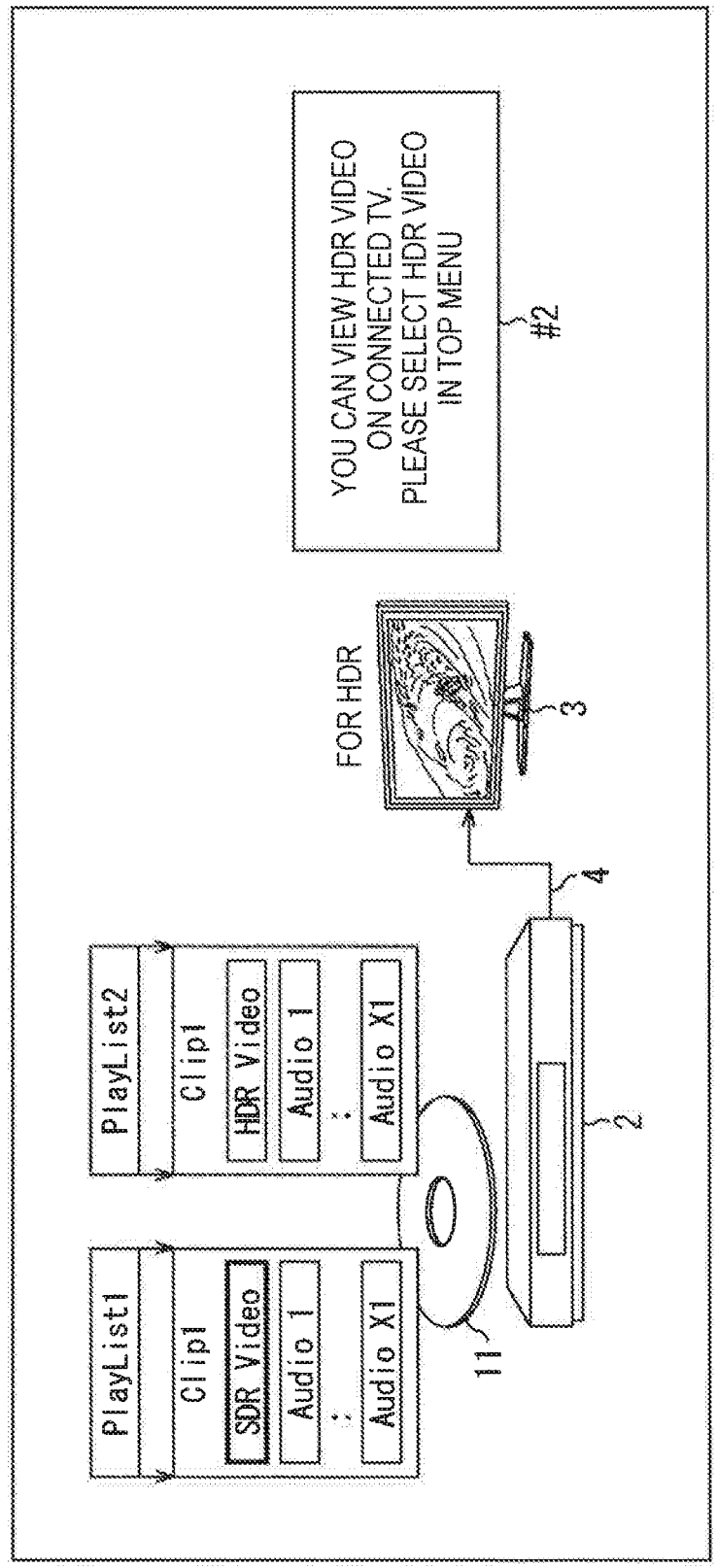
FIG. 28 is a diagram illustrating second exemplary display of a message.

FIG. 28 is a diagram illustrating a second specific example of a message displayed in the processing of FIG. 26.

The example of FIG. 28 is the same as the example illustrated in FIG. 27 except that the display 104 of the display apparatus 3 is a HDR video-compatible display. The AV stream referred to by PlayList1 and the AV stream referred to by PlayList2 are recorded in the disc 11 inserted in the reproducing apparatus 2. The encoding stream of the SDR video is included in the AV stream referred to by PlayList1, and the encoding stream of the HDR video is included in the AV stream referred to by PlayList2.

In this state, it is assumed that the SDR video to be reproduced included in the AV stream referred to by PlayList1 is selected as surrounded in a bold frame via an operation on the menu screen, for example. In this case, the HDR video is selected from the menu screen so that a message #2 for notifying that the compatible HDR video can be viewed is displayed on the display 104.

The user can confirm that the compatible HDR video, which is recorded in the disc 11, is provided.

When the user displays the menu screen and selects the HDR video to be reproduced, the AV stream referred to by PlayList2 is read from the disc 11. Further, the HDR video stream included in the read AV stream is reproduced so that the data of the HDR video is output from the reproducing apparatus 2 to the display apparatus 3.

The HDR video is displayed on the display 104 of the display apparatus 3 on the basis of the data supplied from the reproducing apparatus 2. The user can view the better-quality video viewable under the environment of FIG. 28.

Third Specific Example of Message

Figure 29:
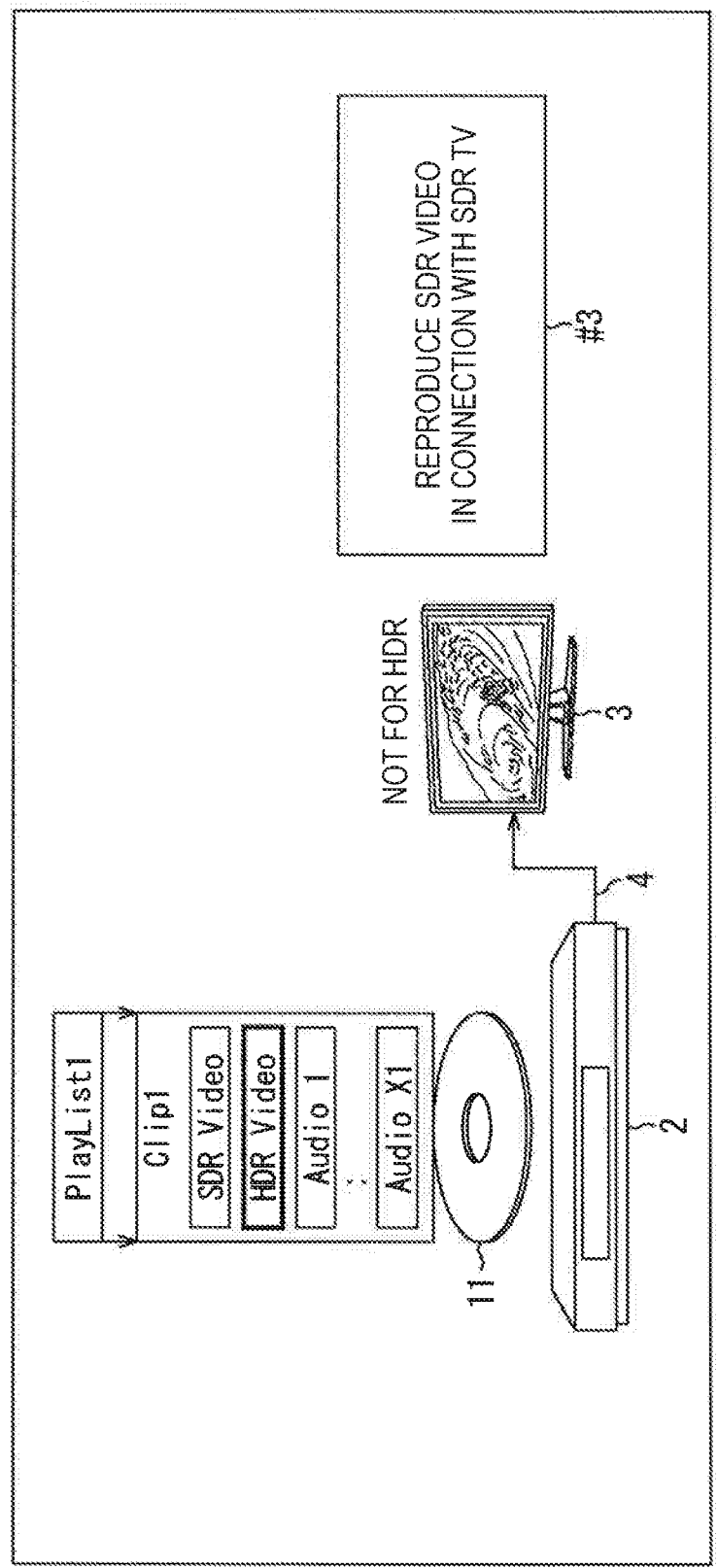
FIG. 29 is a diagram illustrating third exemplary display of a message.

FIG. 29 is a diagram illustrating a third specific example of a message displayed in the processing of FIG. 26.

A form of recording a HDR video and a SDR video illustrated in FIG. 29 is the same as the form illustrated in FIG. 8. The AV stream referred to by PlayList1 is recorded in the disc 11 inserted in the reproducing apparatus 2. The encoding stream of the HDR video and the encoding stream of the SDR video are included in the AV stream referred to by PlayList1.

As described with reference to FIG. 17, HDR_flag of PlayList1 is set at 1, and HDR_compatible_type is set at 01b. The display 104 of the display apparatus 3 is assumed not to be for HDR video.

In this state, it is assumed that the HDR video to be reproduced is selected as surrounded in a bold frame via an operation on the menu screen, for example. The selected HDR video to be reproduced cannot be displayed on the display 104 of FIG. 29.

In this case, the display 104 as output destination is not for displaying the HDR video, and thus a message #3 for notifying that the compatible SDR video starts being reproduced is displayed on the display 104.

The user can confirm that the stream of the compatible SDR video, which is recorded in the disc 11, is provided.

For example, when the user instructs to reproduce the SDR video, the AV stream referred to by PlayList1 is read from the disc 11. Further, the SDR video stream included in the AV stream referred to by PlayList1 is reproduced so that the data of the SDR video is output from the reproducing apparatus 2 to the display apparatus 3.

The SDR video is displayed on the display 104 of the display apparatus 3 on the basis of the data supplied from the reproducing apparatus 2. The user cannot view the HDR video, but can view the SDR video compatible therewith.

Fourth Specific Example of Message

Figure 30:
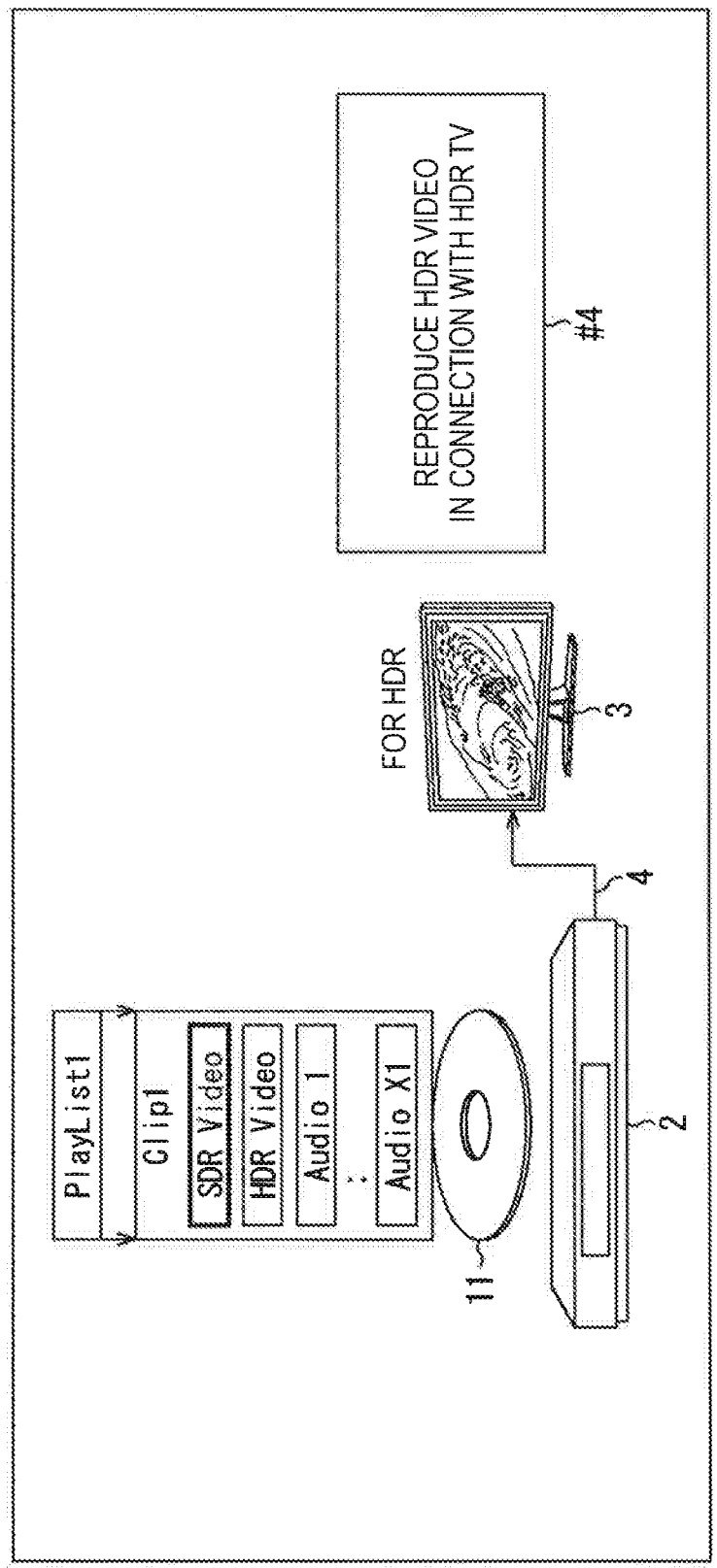
FIG. 30 is a diagram illustrating fourth exemplary display of a message.

FIG. 30 is a diagram illustrating a fourth specific example of a message displayed in the processing of FIG. 26.

The example of FIG. 30 is the same as the example illustrated in FIG. 29 except that the display 104 of the display apparatus 3 is a HDR video-compatible display. The AV stream referred to by PlayList1 is recorded in the disc 11 inserted in the reproducing apparatus 2. The encoding stream of the HDR video and the encoding stream of the SDR video are included in the AV stream referred to by PlayList1.

In this state, it is assumed that the SDR video to be reproduced included in the AV stream referred to by PlayList1 is selected as surrounded in a bold frame via an operation on the menu screen, for example. In this case, the display 104 as output destination is for displaying the HDR video, and thus a message #4 for notifying that the compatible HDR video is to be reproduced is displayed on the display 104.

The user can confirm that the stream of the compatible HDR video, which is recorded in the disc 11, is provided.

For example, when the user instructs to reproduce the HDR video, the AV stream referred to by PlayList1 is read from the disc 11. Further, the HDR video stream included in the AV stream referred to by PlayList1 is reproduced so that the data of the HDR video is output from the reproducing apparatus 2 to the display apparatus 3.

The HDR video is displayed on the display 104 of the display apparatus 3 on the basis of the data supplied from the reproducing apparatus 2. The user can view the better-quality video viewable under the environment of FIG. 30.

Fifth Specific Example of Message

Figure 31:
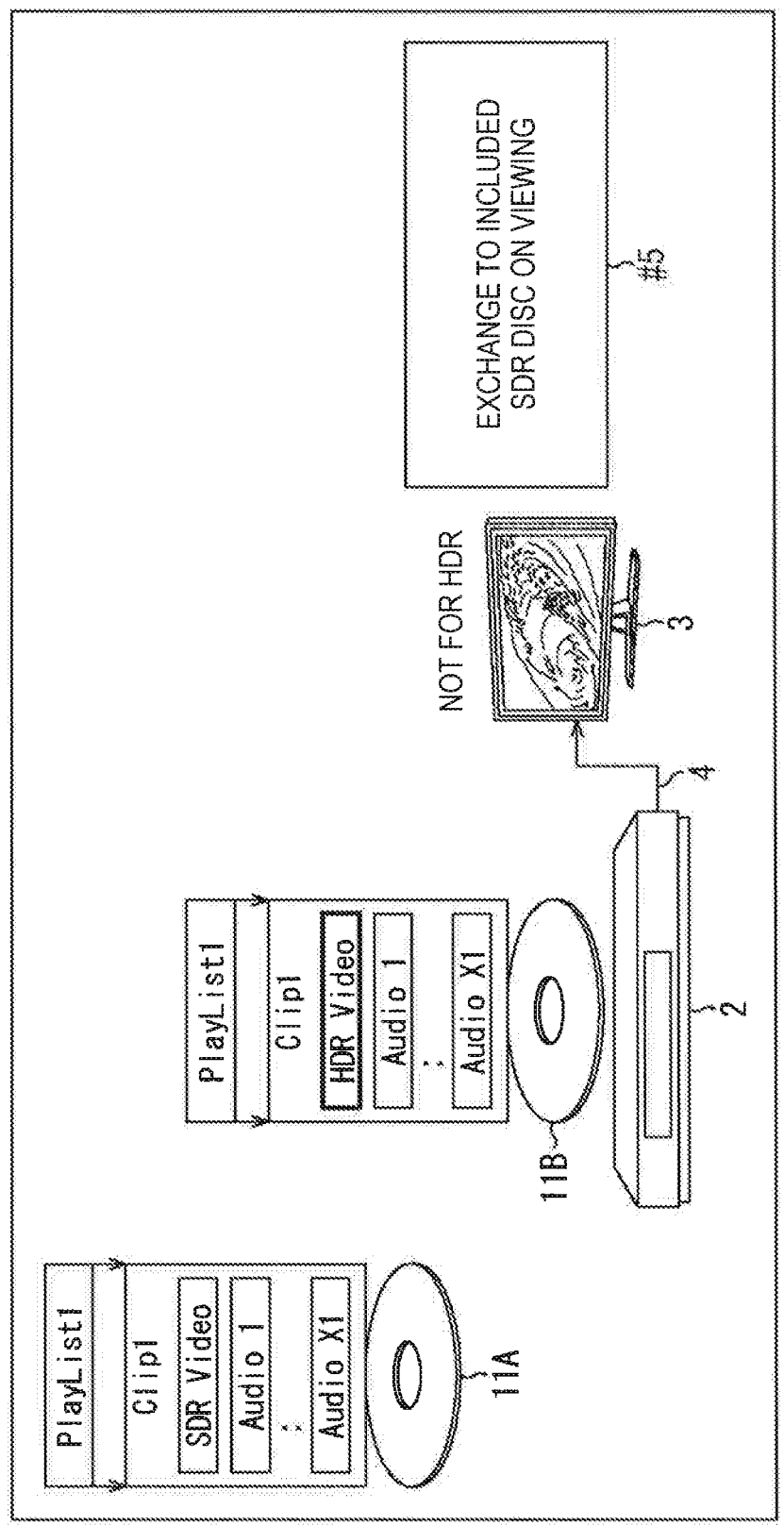
FIG. 31 is a diagram illustrating fifth exemplary display of a message.

FIG. 31 is a diagram illustrating a fifth specific example of a message displayed in the processing of FIG. 26.

A form of recording a HDR video and a SDR video illustrated in FIG. 31 is the same as the form illustrated in FIG. 9. The AV stream including the encoding stream of the SDR video is recorded in the disc 11A. Further, the AV stream including the encoding stream of the HDR video is recorded in the disc 11B.

As described with reference to FIG. 18, HDR_flag of PlayList1 recorded in the disc 11A is set at 0, and HDR_compatible_type is set at 11b. Further, HDR_flag of PlayList1 recorded in the disc 11B is set at 1, and HDR_compatible_type is set at 11b. The display 104 of the display apparatus 3 is assumed not to be for HDR video.

In this state, it is assumed that the user inserts the disc 11B in the reproducing apparatus 2 and selects the HDR video to be reproduced included in the AV stream referred to by PlayList1 as surrounded in a bold frame, for example. The selected HDR video to be reproduced cannot be displayed on the display 104 of FIG. 31.

In this case, the disc 11B is changed to the disc 11A paired therewith, and thus a message #5 for notifying that the compatible SDR video can be viewed is displayed on the display 104.

The user can confirm that the compatible SDR video, which is recorded in the disc 11A paired with the disc 11B, is provided.

When the user inserts the disc 11A instead of the disc 11B and selects the SDR video to be reproduced, the AV stream referred to by PlayList1 is read from the disc 11A. Further, the SDR video stream included in the AV stream referred to by PlayList1 is reproduced so that the data of the SDR video is output from the reproducing apparatus 2 to the display apparatus 3.

The SDR video is displayed on the display 104 of the display apparatus 3 on the basis of the data supplied from the reproducing apparatus 2. The user cannot view the HDR video, but can view the SDR video compatible therewith.

Sixth Specific Example of Message

Figure 32:
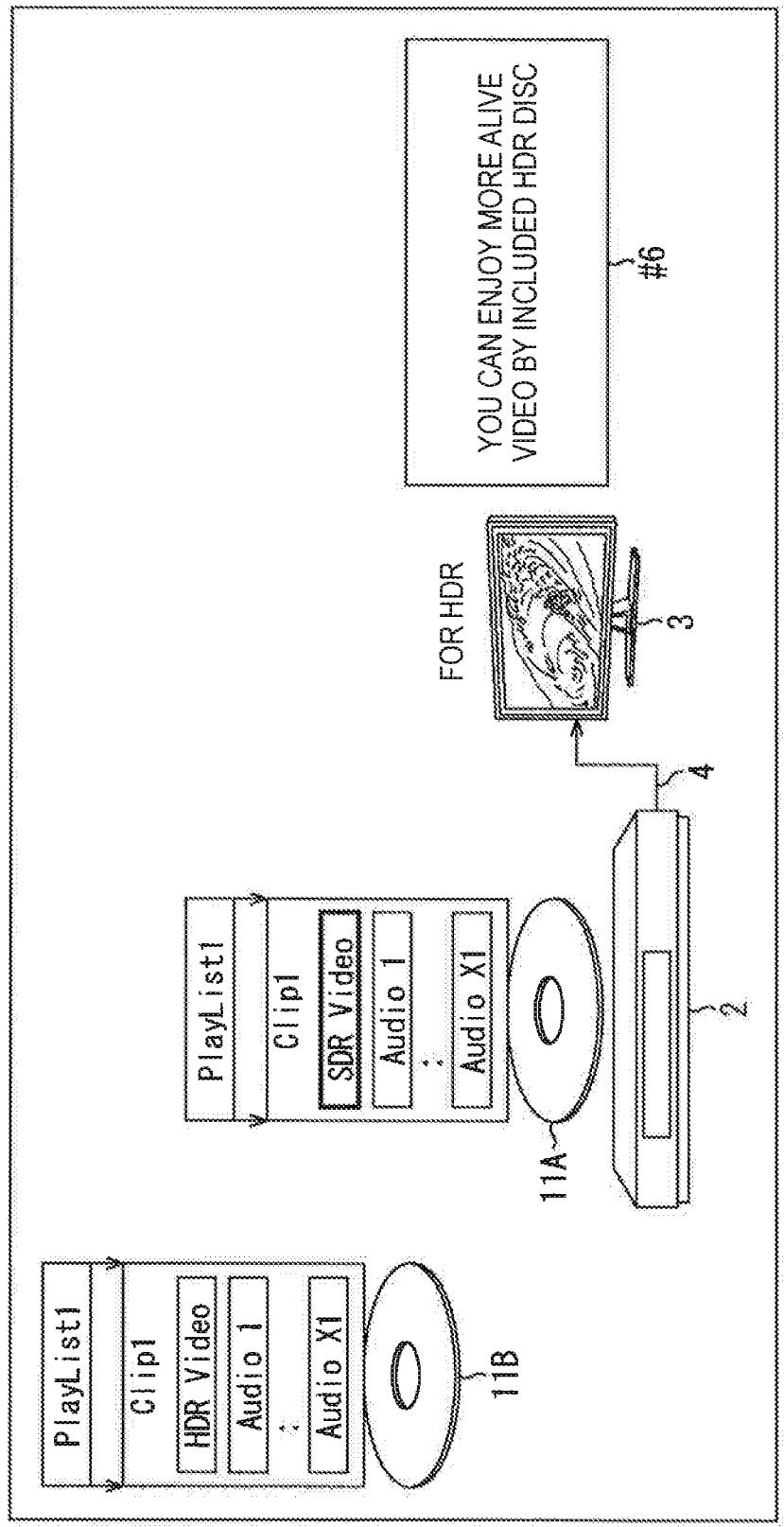
FIG. 32 is a diagram illustrating sixth exemplary display of a message.

FIG. 32 is a diagram illustrating a sixth specific example of a message displayed in the processing of FIG. 26.

The example of FIG. 32 is the same as the example illustrated in FIG. 31 except that the display 104 of the display apparatus 3 is a HDR video-compatible display. The AV stream including the encoding stream of the SDR video is recorded in the disc 11A. Further, the AV stream including the encoding stream of the HDR video is recorded in the disc 11B.

In this state, it is assumed that the user inserts the disc 11A in the reproducing apparatus 2 and selects the SDR video to be reproduced included in the AV stream referred to by PlayList1 as surrounded in a bold frame, for example. In this case, the disc 11A is changed to the disc 11B paired therewith, and thus a message #6 for notifying that the compatible HDR video can be viewed is displayed on the display 104.

The user can confirm that the compatible HDR video, which is recorded in the disc 11B paired with the disc 11A, is provided.

When the user inserts the disc 11B instead of the disc 11A and selects the HDR video to be reproduced, the AV stream referred to by PlayList1 is read from the disc 11B. Further, the HDR video stream included in the AV stream referred to by PlayList1 is reproduced so that the data of the HDR video is output from the reproducing apparatus 2 to the display apparatus 3.

The HDR video is displayed on the display 104 of the display apparatus 3 on the basis of the data supplied from the reproducing apparatus 2. The user can view the better-quality video viewable under the environment of FIG. 32.

<5. Variants>

Exemplary Data Base Information

A compatible video may be provided via a network. In this case, a value indicating the fact is set in HDR_compatible_type. For example, when HDR_compatible_type indicates that a compatible video is provided via a network, information such as URL of a server for distributing the compatible video is described in the Data Base information.

The reproducing apparatus 2 accesses the server on the basis of the URL, and receives and reproduces the compatible video.

Other Exemplary Configurations

The description has been made above mainly assuming that the reproducing apparatus 2 is a Mandatory/Option A/Option B HDR-compatible Player, but a similar processing to the processing of FIG. 26 is performed when the reproducing apparatus 2 has other reproduction capability.

Figure 33:
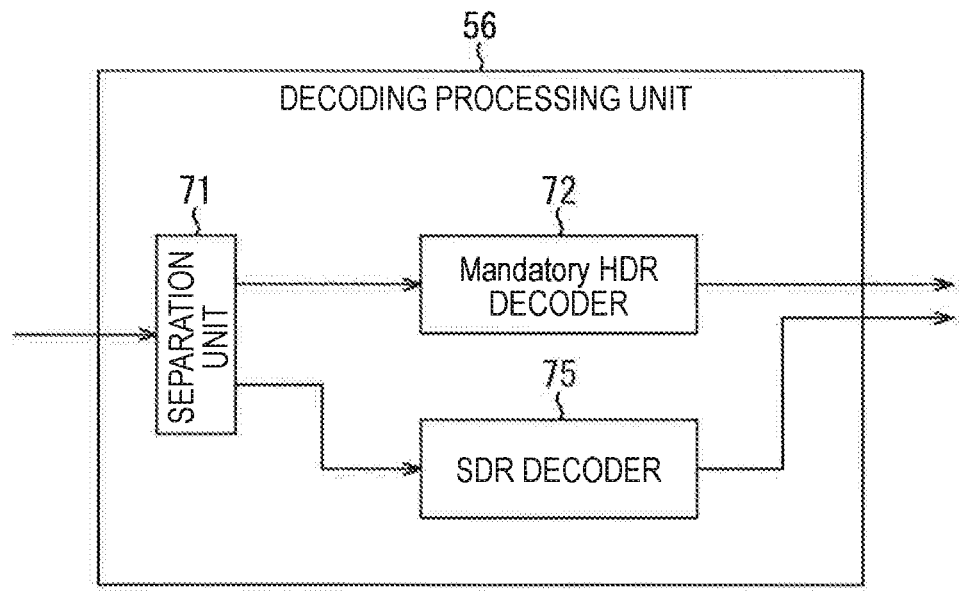
FIG. 33 is a block diagram illustrating an exemplary configuration of the decoding processing unit provided in a Mandatory HDR-compatible Player.

FIG. 33 is a block diagram illustrating an exemplary configuration of the decoding processing unit 56 provided in the reproducing apparatus 2 as Mandatory HDR-compatible Player.

The configuration illustrated in FIG. 33 is the same as the configuration illustrated in FIG. 22 except that the Option A HDR decoder 73 and the Option B HDR decoder 74 are not provided.

Figure 34:
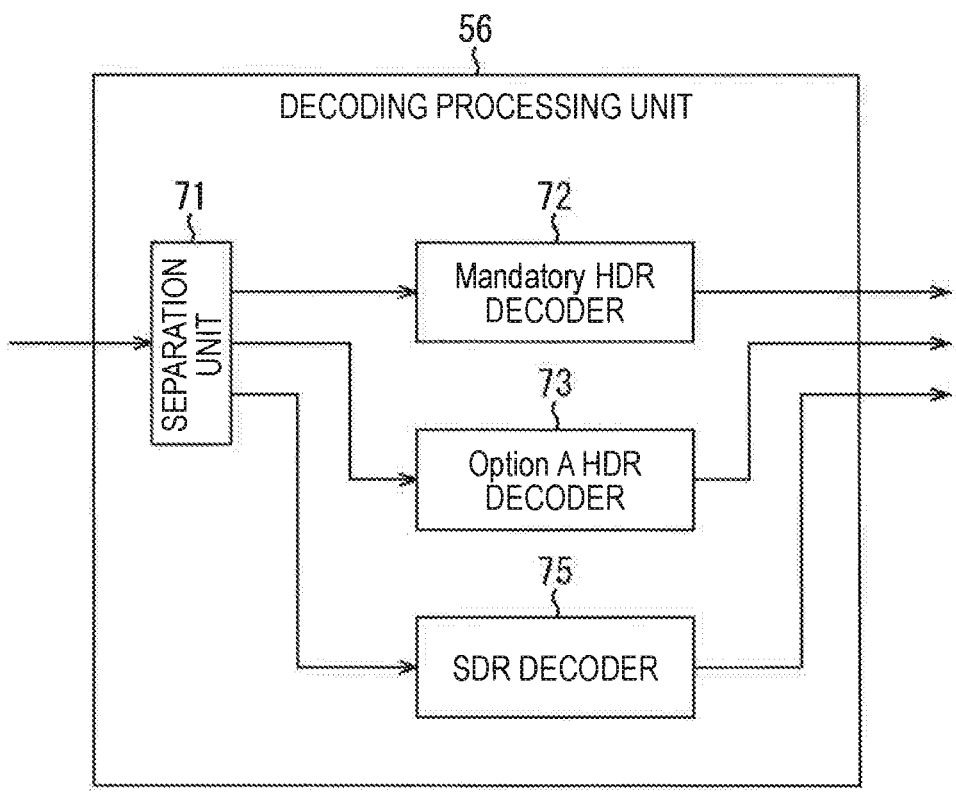
FIG. 34 is a block diagram illustrating an exemplary configuration of the decoding processing unit provided in a Mandatory/Option A HDR-compatible Player.

FIG. 34 is a block diagram illustrating an exemplary configuration of the decoding processing unit 56 provided in the reproducing apparatus 2 as Mandatory/Option A HDR-compatible Player.

The configuration illustrated in FIG. 34 is the same as the configuration illustrate in FIG. 22 except that the Option B HDR decoder 74 is not provided.

Figure 35:
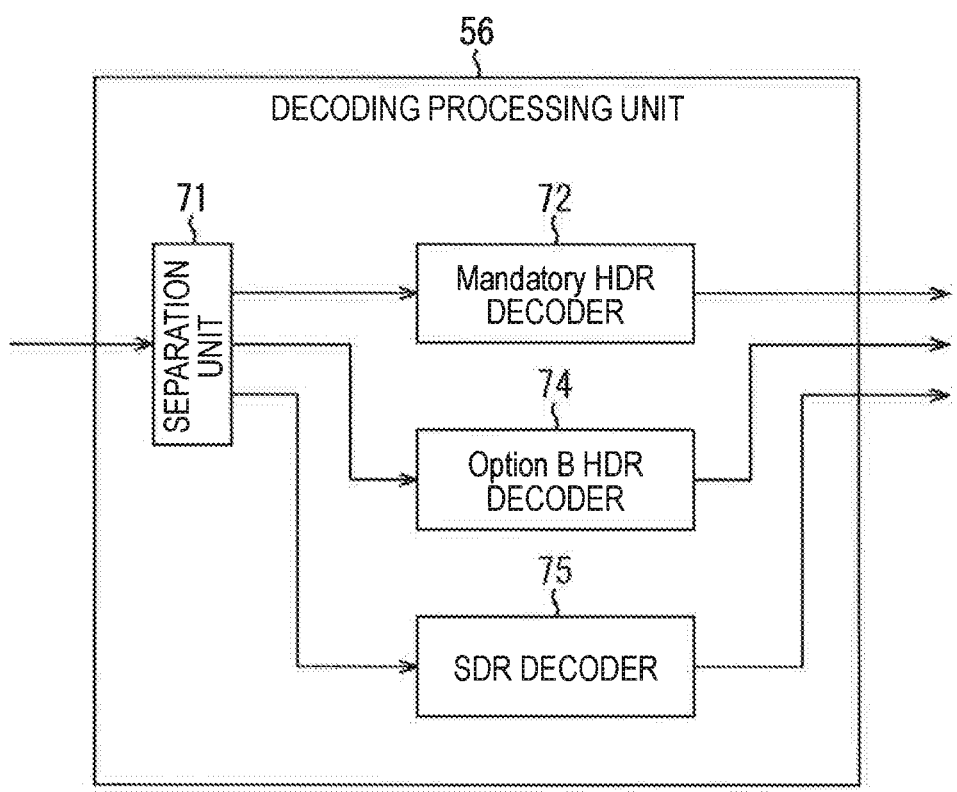
FIG. 35 is a block diagram illustrating an exemplary configuration of the decoding processing unit provided in a Mandatory/Option B HDR-compatible Player.

FIG. 35 is a block diagram illustrating an exemplary configuration of the decoding processing unit 56 provided in the reproducing apparatus 2 as Mandatory/Option B HDR-compatible Player.

The configuration illustrated in FIG. 35 is the same as the configuration illustrated in FIG. 22 except that the Option A HDR decoder 73 is not provided.

Exemplary Configuration of Computer

A series of processing described above may be performed in hardware or in software. When the series of processing is performed in software, the programs configuring the software are installed from a program recording medium into a computer incorporated in dedicated hardware, a general-purpose personal computer, or the like.

Figure 36:
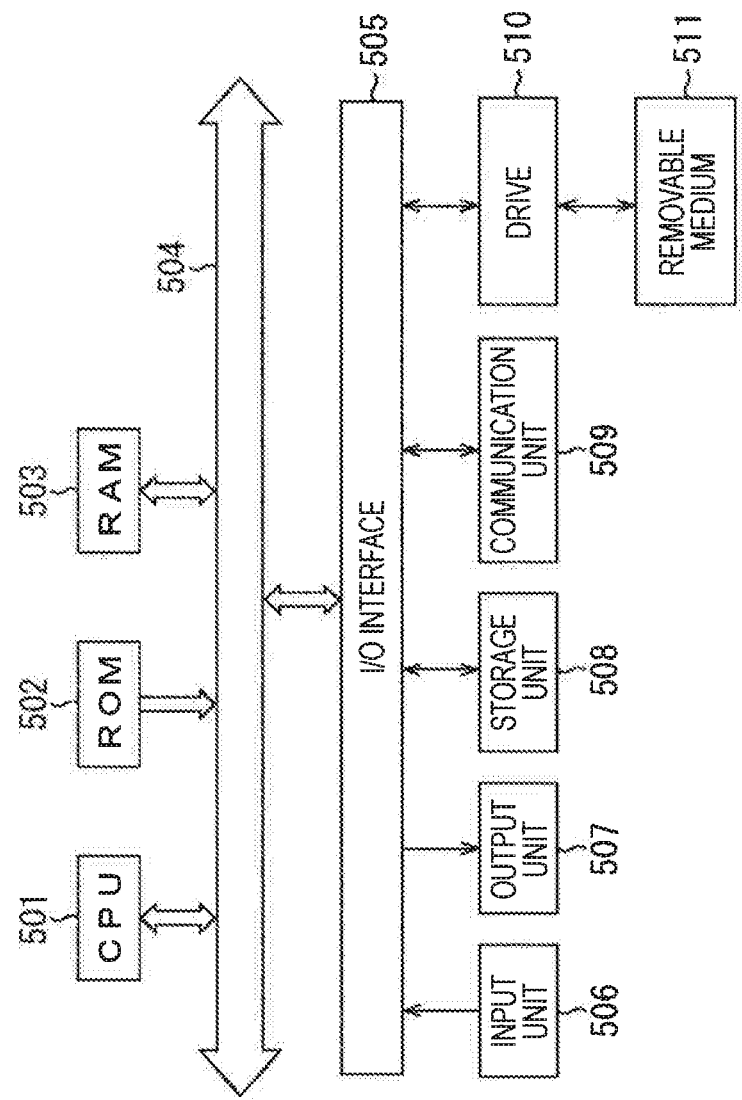
FIG. 36 is a block diagram illustrating an exemplary configuration of a computer.

FIG. 36 is a block diagram illustrating an exemplary hardware configuration of a computer for performing the series of processing by the programs.

A CPU 501, a ROM 502, and a RAM 503 are mutually connected via a bus 504.

The bus 504 is further connected with an Input/output interface 505. The Input/output interface 505 is connected with an input unit 506 configured of a keyboard, mouse, or the like, and an output unit 507 configured of a display, speaker, or the like. Further, the Input/output interface 505 is connected with a storage unit 508 configured of a hard disc, nonvolatile memory, or the like, a communication unit 509 configured of a network interface or the like, and a drive 510 for driving a removable medium 511.

In the thus-configured computer, the CPU 501 loads and executes the programs stored in the storage unit 508 into the RAM 503 via the Input/output interface 505 and the bus 504, for example, so that the series of processing is performed.

The programs executed by the CPU 501 are recorded in the removable medium 511, for example, or provided via a wired, or wireless transmission medium such as local area network, Internet, or digital broadcasting and installed in the storage unit 508.

Additionally, the programs executed by the computer may be such that the series of processing is performed in time series in the order described in the specification, or such that the multiple kinds of processing is performed in parallel or at necessary timings such as on call.

In the specification, a system indicates a set of components (such as apparatuses and modules (parts)), and all the components may or may not be present in the same casing. Therefore, a system is a plurality of apparatuses housed in different casings and connected via a network, or an apparatus in which a plurality of modules are housed in one casing.

Additionally, the effects described in the specification are merely exemplary and are not limited, and other effect may be obtained.

An exemplary embodiment of the present technology is not limited to the above exemplary embodiment, and can be variously changed within the scope without departing from the spirit of the present technology.

For example, the present technology may be configured. In cloud computing in which one function is distributed and processed in a plurality of apparatuses via a network.

Further, each step described in the flowcharts may be performed in one apparatus, or may be distributed and performed in a plurality of apparatuses.

Further, when multiple kinds of processing are included in one step, the multiple kinds of processing included in the step may be performed in one apparatus, or may be distributed and performed in a plurality of apparatuses.

Exemplary Combinations of Configurations

The present technology may take the following configurations.

(1)

A reproducing apparatus including:

a control unit for analyzing reproduction management information describing therein type information on a form of providing a HDR video which is compatible with a SDR video with a standard luminance range and whose luminance range is wider than the standard luminance range, or a form of providing the SDR video compatible with the HDR video;

an acquisition unit for acquiring encoding data of the HDR video or encoding data of the SDR video provided in a form indicated by the type information; and a reproducing unit for reproducing the acquired encoding data of the HDR video or the encoding data of the SDR video.

(2)

The reproducing apparatus according to (1), further including:

a communication unit for making communication with a display apparatus having a display as output destination and acquiring information on a display capability of the display.

(3)

The reproducing apparatus according to (2), wherein when the display is not for displaying the HDR video, the control unit presents the form of providing the compatible SDR video before reproducing the HDR video, and the acquisition unit acquires the encoding data of the SDR video provided in the form indicated by the type information.

(4)

The reproducing apparatus according to (2) or (3), wherein when the display is for displaying the HDR video, the control unit presents the form of providing the compatible HDR video before reproducing the SDR video, and the acquisition unit acquires the encoding data of the HDR video provided in the form indicated by the type information.

(5)

The reproducing apparatus according to any of (1) to (4), wherein the control unit analyzes the reproduction management, information acquired from, a recording medium inserted, in the reproducing apparatus, and the acquisition unit acquires the encoding data of the HDR video or the encoding data of the SDR video from the receding medium.

(6)

The reproducing apparatus according to (5), wherein the type information indicates whether the encoding data of the HDR video and the encoding data of the SDR video, which are compatible, are recorded in the same recording medium, or recoded in the different recording media.

(7)

The reproducing apparatus according to (5) or (6), wherein the type information indicates whether the encoding data of the HDR video and the encoding data of the SDR video, which are compatible, are included in the same stream recorded in the recording medium, or included in different streams.

(8)

The reproducing apparatus according to any of (5) to (7), wherein the recording medium is a Blu-ray Disc, and the type information is described in the reproduction management information such as Index table, PlayList or Clip Information.

(9)

A reproducing method including the steps of:

analyzing reproduction management information describing therein type information on a form of providing a HDR video which is compatible with a SDR video with a standard luminance range and whose luminance range is wider than the standard luminance range, or a form of providing the SDR video compatible with the HDR video;

acquiring encoding data of the HDR video or encoding data of the SDR video provided in a form indicated by the type information; and reproducing the acquired encoding data of the HDR video or the encoding data of the SDR video.

(10)

A program for causing a computer to perform a processing including the steps of:

analyzing reproduction management information describing therein type information on a form of providing a HDR video which is compatible with a SDR video with a standard luminance range and whose luminance range is wider than the standard luminance range, or a form of providing the SDR video compatible with the HDR video;

acquiring encoding data of the HDR video or encoding data of the SDR video provided in a form indicated by the type information; and reproducing the acquired encoding data of the HDR video or the encoding data of the SDR video.

(11)

An information processing apparatus including:

a video generation unit for generating encoding data of a SDR video with a standard luminance range and encoding data of a HDR video which is compatible with the SDR video and whose luminance range is wider than the standard luminance range on the basis of a master video; and a reproduction management information generation unit for generating reproduction management information describing therein type information on a form of providing the HDR video compatible with the SDR video or a form of providing the SDR video compatible with the HDR video.

(12)

An information processing method including the steps of:

generating encoding data of a SDR video with a standard luminance range and encoding data of a HDR video which is compatible with the SDR video and whose luminance range is wider than the standard luminance range on the basis of a master video; and generating reproduction management information describing therein type information on a form of providing the HDR video compatible with the SDR video or a form of providing the SDR video compatible with the HDR video.

(13)

A program for causing a computer to perform a processing including the steps of:

generating encoding data of a SDR video with a standard luminance range and encoding data of a HDR video which is compatible with the SDR video and whose luminance range is wider than the standard luminance range on the basis of a master video; and generating reproduction management information describing therein type information on a form of providing the HDR video compatible with the SDR video or a form of providing the SDR video compatible with the HDR video.

(14)

A recording medium which records therein at least either encoding data of a SDR video with a standard luminance range or encoding data of a HDR video which is compatible with the SDR video and whose luminance range is wider than the standard luminance range, which are generated on the basis of a master video, and either reproduction management information describing therein type information on a form of providing the HDR video compatible with the SDR video when the encoding data of the SDR video is recorded or the reproduction management information describing therein the type information on a form of providing the SDR video compatible with the HDR video when the encoding data of the HDR video is recorded.

(15)

The recording medium according to (14), wherein the recording medium is a Blu-ray Disc, and the type information is described in the reproduction management, information such as Index table, PlayList, or Clip Information.

REFERENCE SIGNS LIST

1 Recording apparatus
2 Reproducing apparatus
3 Display apparatus
11 Disc
21 Controller
21 Data Base information generation unit
22 Encoding processing unit
23 Disc drive
31 Mandatory HDR encoder
32 Option A HDR encoder
33 Option B HDR encoder
34 SDR encoder
35 Multiplexer
51 Controller
52 Disc drive
53 Memory
56 Decoding processing unit
58 Communication unit
71 Separation unit
72 Mandatory HDR decoder
73 Option A HDR decoder
74 Option B HDR decoder
75 SDR decoder

The invention claimed is:

1. A reproducing apparatus comprising:
a register having set therein information on a display capability of a display of a display apparatus as an output destination and which is communicatively coupled to the reproducing apparatus, and information on a reproduction capability of the reproducing apparatus;

a control unit for analyzing reproduction management information describing therein type information on a form of providing an HDR video which is compatible with an SDR video with a standard luminance range and whose luminance range is wider than the standard luminance range, or a form of providing the SDR video compatible with the HDR video, wherein the reproduction management information is analyzed and the type information is obtained prior to execution of reproduction processing of an encoded video stream having video data including the HDR video or the SDR video and also prior to any processing or conversion of the video data, wherein the type information includes an HDR flag with a set value indicating whether HDR data is recorded, and wherein the type information is not obtained from the encoded video stream;

an acquisition unit for selectively acquiring, based on the information on the display capability and the information on the reproduction capability, encoding data of the HDR video or encoding data of the SDR video provided in a form indicated by the type information; and a reproducing unit for reproducing the acquired encoding data of the HDR video or the encoding data of the SDR video, wherein the HDR video compatible with the SDR video is HDR video that is to be reproduced instead of the SDR video, when the SDR video is instructed to be reproduced but the display as the output destination is compatible with displaying the HDR video and the set value of the HDR flag indicates that HDR data is recorded, and wherein the SDR video compatible with the HDR video is SDR video that is to be reproduced instead of the HDR video, when the HDR video is instructed to reproduced but the display as the output destination is not compatible with displaying the HDR video and the set value of the HDR flag indicates that HDR data is not recorded.

2. The reproducing apparatus according to claim 1, further comprising:
a communication unit for making communication with the display apparatus having the display as the output destination and acquiring the information on the display capability of the display.

3. The reproducing apparatus according to claim 2,
wherein when the display is not compatible with displaying the HDR video, the control unit presents the form of providing the compatible SDR video before reproducing the HDR video, and
the acquisition unit acquires the encoding data of the SDR video provided in the form indicated by the type information.

4. The reproducing apparatus according to claim 2,
wherein when the display is compatible with displaying the HDR video, the control unit presents the form of providing the compatible HDR video before reproducing the SDR video, and
the acquisition unit acquires the encoding data of the HDR video provided in the form indicated by the type information.

5. The reproducing apparatus according to claim 1,
wherein the control unit analyzes the reproduction management information acquired from a recording medium inserted in the reproducing apparatus, and
the acquisition unit acquires the encoding data of the HDR video or the encoding data of the SDR video from the recoding medium.

6. The reproducing apparatus according to claim 5,
wherein the type information indicates whether the encoding data of the HDR video and the encoding data of the SDR video, which are compatible, are recorded in the same recording medium, or recoded in the different recording media.

7. The reproducing apparatus according to claim 5,
wherein the type information indicates whether the encoding data of the HDR video and the encoding data of the SDR video, which are compatible, are included in the same stream recorded in the recording medium, or included in different streams.

8. The reproducing apparatus according to claim 5,
wherein the recording medium is a Blu-ray Disc, and
the type information is described in the reproduction management information such as Index table, PlayList or Clip Information.

9. The reproducing apparatus according to claim 1,
wherein the type information is described in the reproduction management information within an Index table, a PlayList, or a Clip Information, provided separate from the video stream.

10. A reproducing method comprising the steps of:
setting, in a register of a reproducing apparatus, information on a display capability of a display of a display apparatus as an output destination and which is communicatively coupled to the reproducing apparatus, and information on a reproduction capability of the reproducing apparatus;

analyzing reproduction management information describing therein type information on a form of providing an HDR video which is compatible with an SDR video with a standard luminance range and whose luminance range is wider than the standard luminance range, or a form of providing the SDR video compatible with the HDR video, wherein the reproduction management information is analyzed and the type information is obtained prior to execution of reproduction processing of an encoded video stream having video data including the HDR video or the SDR video and also prior to any processing or conversion of the video data, wherein the type information includes an HDR flag with a set value indicating whether HDR data is recorded, and wherein the type information is not obtained from the encoded video stream;

selectively acquiring, based on the information on the display capability and the information on the reproduction capability, encoding data of the HDR video or encoding data of the SDR video provided in a form indicated by the type information; and reproducing the acquired encoding data of the HDR video or the encoding data of the SDR video, wherein the HDR video compatible with the SDR video is HDR video that is to be reproduced instead of the SDR video, when the SDR video is instructed to be reproduced but the display as the output destination is compatible with displaying the HDR video and the set value of the HDR flag indicates that HDR data is recorded, and wherein the SDR video compatible with the HDR video is SDR video that is to be reproduced instead of the HDR video, when the HDR video is instructed to reproduced but the display as the output destination is not compatible with displaying the HDR video and the set value of the HDR flag indicates that HDR data is not recorded.

11. A non-transitory computer-readable medium having embodied thereon a program, which when executed by a computer causes the computer to execute a method, the method comprising:

setting, in a register of a reproducing apparatus, information on a display capability of a display of a display apparatus as an output destination and which is communicatively coupled to the reproducing apparatus, and information on a reproduction capability of the reproducing apparatus;

analyzing reproduction management information describing therein type information on a form of providing an HDR video which is compatible with an SDR video with a standard luminance range and whose luminance range is wider than the standard luminance range, or a form of providing the SDR video compatible with the HDR video, wherein the reproduction management information is analyzed and the type information is obtained prior to execution of reproduction processing of an encoded video stream having video data including the HDR video or the SDR video and also prior to any processing or conversion of the video data, wherein the type information includes an HDR flag with a set value indicating whether HDR data is recorded, and wherein the type information is not obtained from the encoded video stream;

selectively acquiring, based on the information on the display capability and the information on the reproduction capability, encoding data of the HDR video or encoding data of the SDR video provided in a form indicated by the type information; and reproducing the acquired encoding data of the HDR video or the encoding data of the SDR video, wherein the HDR video compatible with the SDR video is HDR video that is to be reproduced instead of the SDR video, when the SDR video is instructed to be reproduced but the display as the output destination is compatible with displaying the HDR video and the set value of the HDR flag indicates that HDR data is recorded, and wherein the SDR video compatible with the HDR video is SDR video that is to be reproduced instead of the HDR video, when the HDR video is instructed to reproduced but the display as the output destination is not compatible with displaying the HDR video and the set value of the HDR flag indicates that HDR data is not recorded.

* * * * *